United States Patent [19]
Jack et al.

[11] 3,914,119
[45] Oct. 21, 1975

[54] METHODS OF TOUGHENING A GLASS SHEET

[75] Inventors: Harry Ross Scarlett Jack, Tanworth-in-Arden; Arthur Joseph Nobbs, Alvechurch, both of England

[73] Assignee: Triplex Safety Glass Company Limited, London, England

[22] Filed: Mar. 12, 1974

[21] Appl. No.: 450,371

[30] Foreign Application Priority Data
July 20, 1973 United Kingdom............... 34705/73

[52] U.S. Cl. ....................... 65/104; 65/114; 65/116
[51] Int. Cl.²........................................ C03B 27/00
[58] Field of Search...................... 65/104, 114, 116

[56] References Cited
UNITED STATES PATENTS
| | | | |
|---|---|---|---|
| 2,442,242 | 5/1948 | Lewis............................. | 65/104 X |
| 3,341,313 | 9/1967 | Wheeler et al. .................... | 65/104 |
| 3,365,285 | 1/1968 | Richardson......................... | 65/104 |
| 3,701,266 | 10/1972 | Chisholm......................... | 65/104 X |

FOREIGN PATENTS OR APPLICATIONS
1,241,524   8/1971   United Kingdom................... 65/104

*Primary Examiner*—Arthur D. Kellogg
*Attorney, Agent, or Firm*—Burns, Doane, Swecker & Mathis

[57] ABSTRACT

A glass sheet is toughened by quenching the sheet after it has been contacted by shaping surfaces. Prior to quenching, for example in a chilling liquid, the glass sheet is heated throughout is bulk to a pre-quenching temperature which is higher than the temperature of the glass while it was being shaped.

25 Claims, 25 Drawing Figures

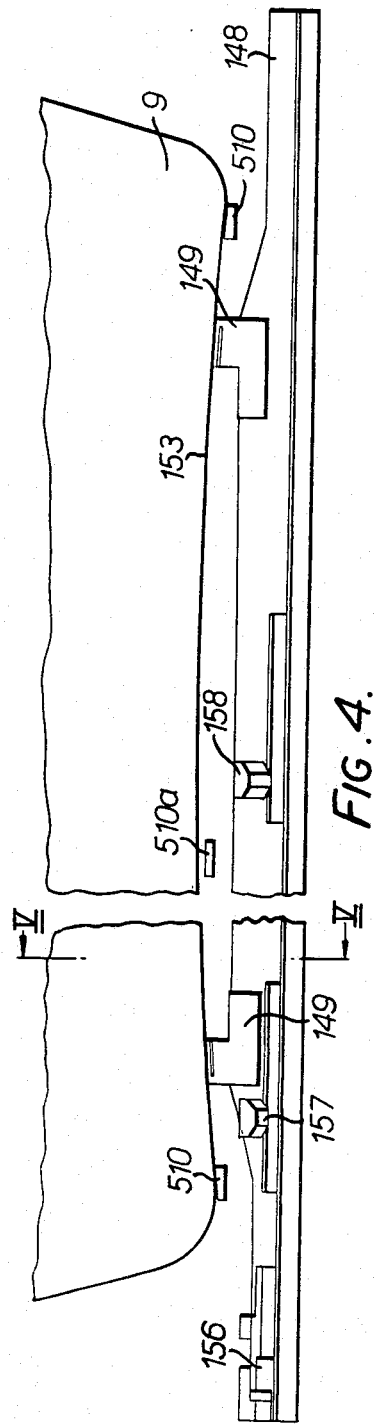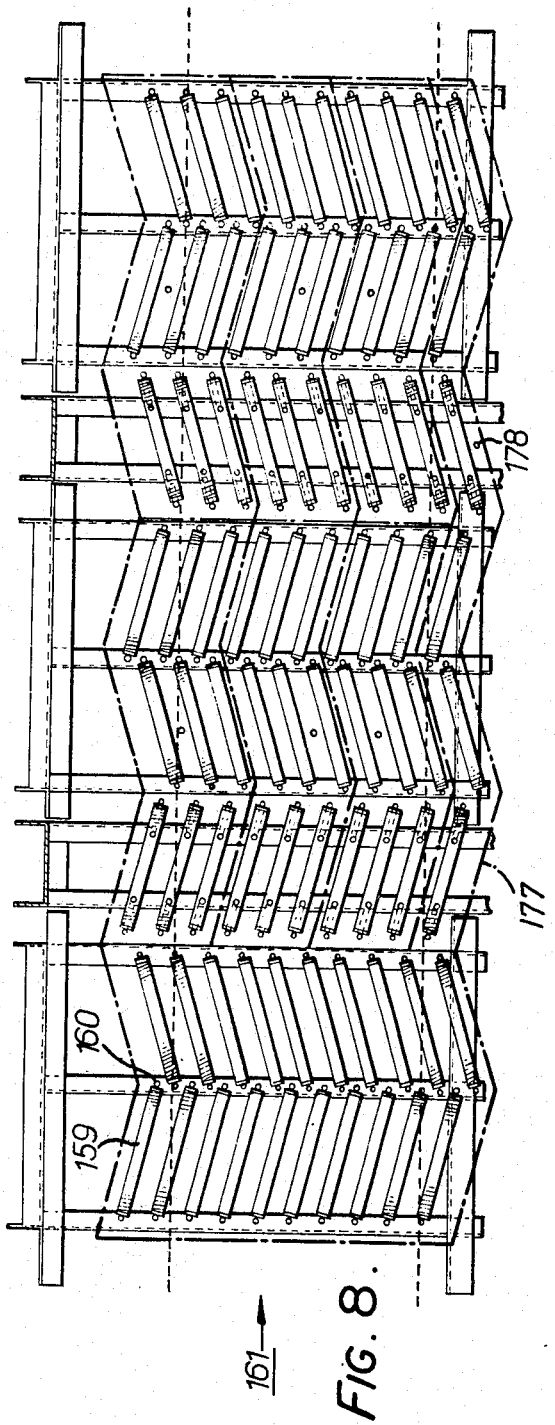

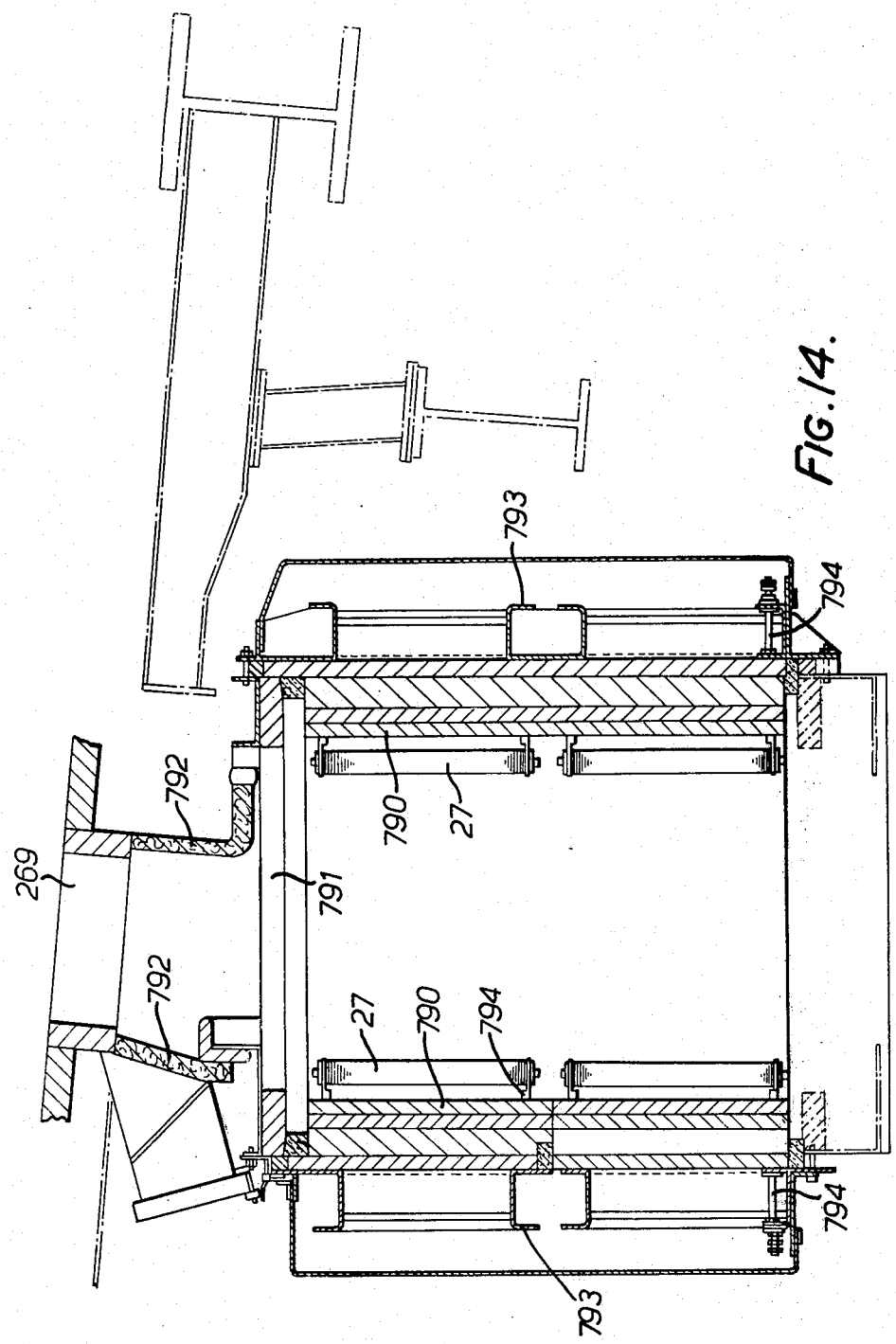

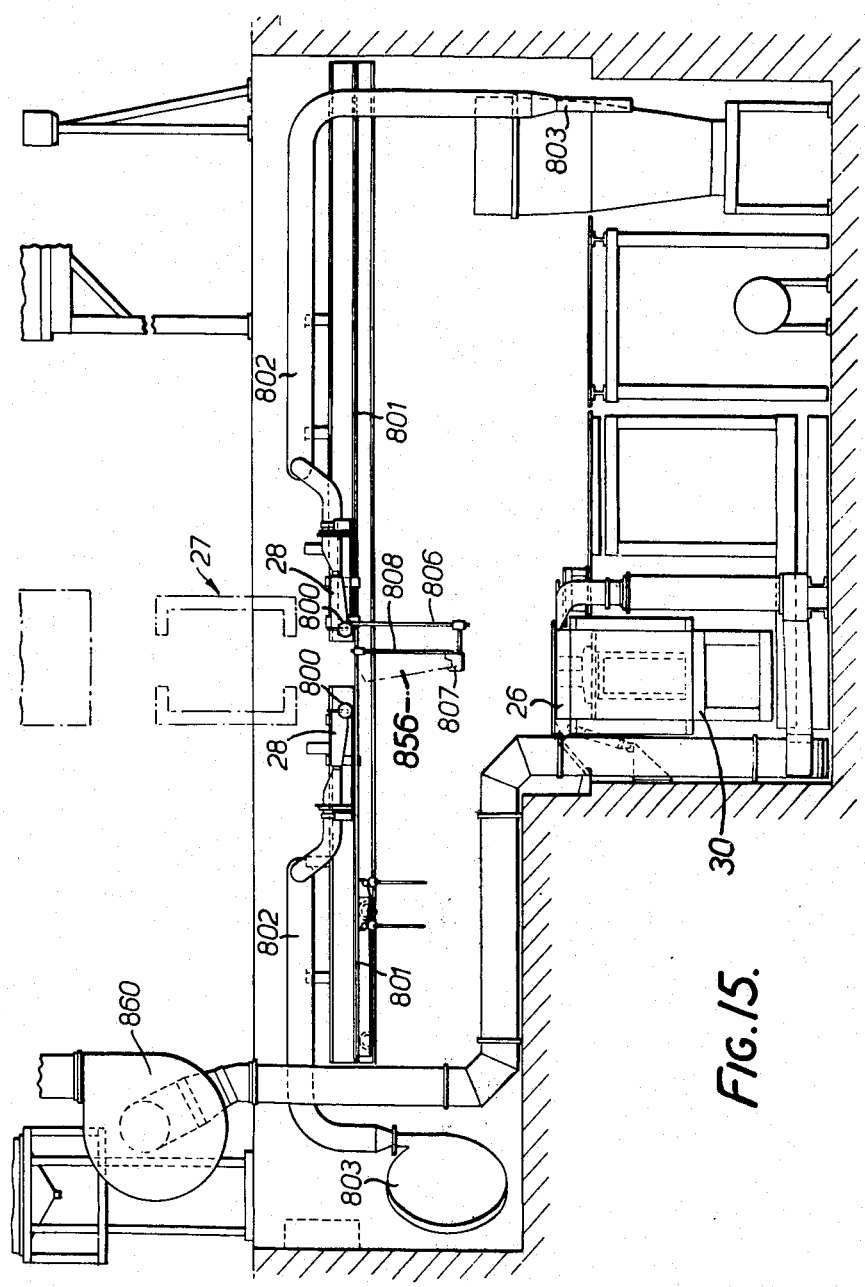

METHODS OF TOUGHENING A GLASS SHEET

BACKGROUND OF THE INVENTION

1. Field of the Invention

This invention relates to the toughening of glass sheets. More particularly the invention relates to the bending of glass sheets which are to be subsequently toughened and used in the manufacture of windows for vehicles, for example motor vehicle windscreens and aircraft windscreens. Such a glass sheet may be used alone as a vehicle windscreen, or may be either used as one of the laminates of a composite laminated glass windscreen.

It is customary to laminate two thin sheets of glass together to form a windscreen using an interlayer of transparent plastics material, for example polyvinylbutyral. In such a windscreen both sheets may be of annealed glass or both of toughened glass and in a current proposal a laminated windscreen having a dual fracture characteristic is fabricated using a sheet of annealed glass as the outer sheet and a sheet of toughened glass as the inner sheet.

With such a windscreen visibility is retained even if the outer annealed sheet is fractured by a sharp flying stone, while the inner toughened sheet fragments rapidly when struck by the head of an occupant of the vehicle.

2. Description of the Prior Art

Usually the manufacture of a toughened glass sheet for a windscreen the sheet of flat glass is first cut to the appropriate shape. Then the glass is heated to a bending temperature during traverse through a heating furnace while suspended by tongs from an overhead conveyor which then conveys the glass between vertical bending dies which close on to the glass sheet and bend the sheet to the desired curvature.

Thereafter the bent glass is conveyed between blowing frames where the glass is toughened, or the glass is conveyed through an annealing lehr when an annealed glass sheet is required; the glass still being suspended by tongs which grip the upper edge of the sheet.

Two sheets of glass which are to have accurately matching curvature for subsequent lamination have been bent by a sag-bending process in which the two sheets lying one on top of the other are placed horizontally on a sag-bending mould and then conveyed through an oven where the glass sheets are heated and sag together to the desired matching curvature.

In a more recently developed process a sheet of flat glass cut to the desired shape is suspended by tongs in a heating furnace having an open mouth in its floor, and when at bending temperature is lowered to a location between bending dies which close on to the sheet and bend it to a desired curvature before the sheet is lowered through a pre-cooling stage in which cooling air is blown on to the sheet, followed immediately by quenching in a quenching liquid, for example a mineral oil or a mineral oil with a minor amount of low boiling point additive. Toluene or carbon tetrachloride are suitable additives. This process has been particularly effective for the production of high strength glass for aircraft windscreens, and bent and toughened glass of thickness 1.5 to 3 mm for use in the manufacture of laminated windscreens for motor vehicles.

It is desirable when bending a sheet of glass that the sheet shall not be heated prior to bending to a temperature much above that necessary for satisfactory bending, thereby avoiding the possibility of introducing unacceptable deformation into the sheet.

SUMMARY

It is a main object of the present invention to produce a high strength bent glass sheet by heating the sheet after shaping to a high pre-quenching temperature.

In the method of the invention a glass sheet to be toughened is heated to a predetermined temperature condition in which it can be shaped, and glass-shaping surfaces are closed on to the sheet, which surfaces are maintained in the same temperature condition as the glass sheet. After the shaping surfaces have been retracted from the sheet, the glass sheet is heated to a pre-quenching thermal condition throughout its bulk, and then toughened by contacting its surfaces with a chilling medium, for example a chilling liquid.

When the glass is a sheet of soda-lime-silica glass, the bending temperature may be in the range 570° to 650°C, and the pre-quenching temperature in the range 620° to 720°C.

BRIEF DESCRIPTION OF THE DRAWINGS

An embodiment of the invention will now be described, by way of example, with reference to the accompanying drawings in which:

FIG. 4 is a front elevation of a carriage on which a glass sheet is supported for transportation through the furnace, FIG. 8 illustrates an arrangement of electrical heaters on the opposite side wall of the furnace, FIG. 14 is a vertical section through panels of boost heaters which are located beneath the tilting box and between which a bent glass sheet is lowered for heating prior to toughening, FIG. 15 is a generalised sectional view through the lower part of the pit below the tilting box showing a pre-cooling stage and a tank of chilling liquid in more detail.

DESCRIPTION OF THE PREFERRED EMBODIMENT

Figure 1:
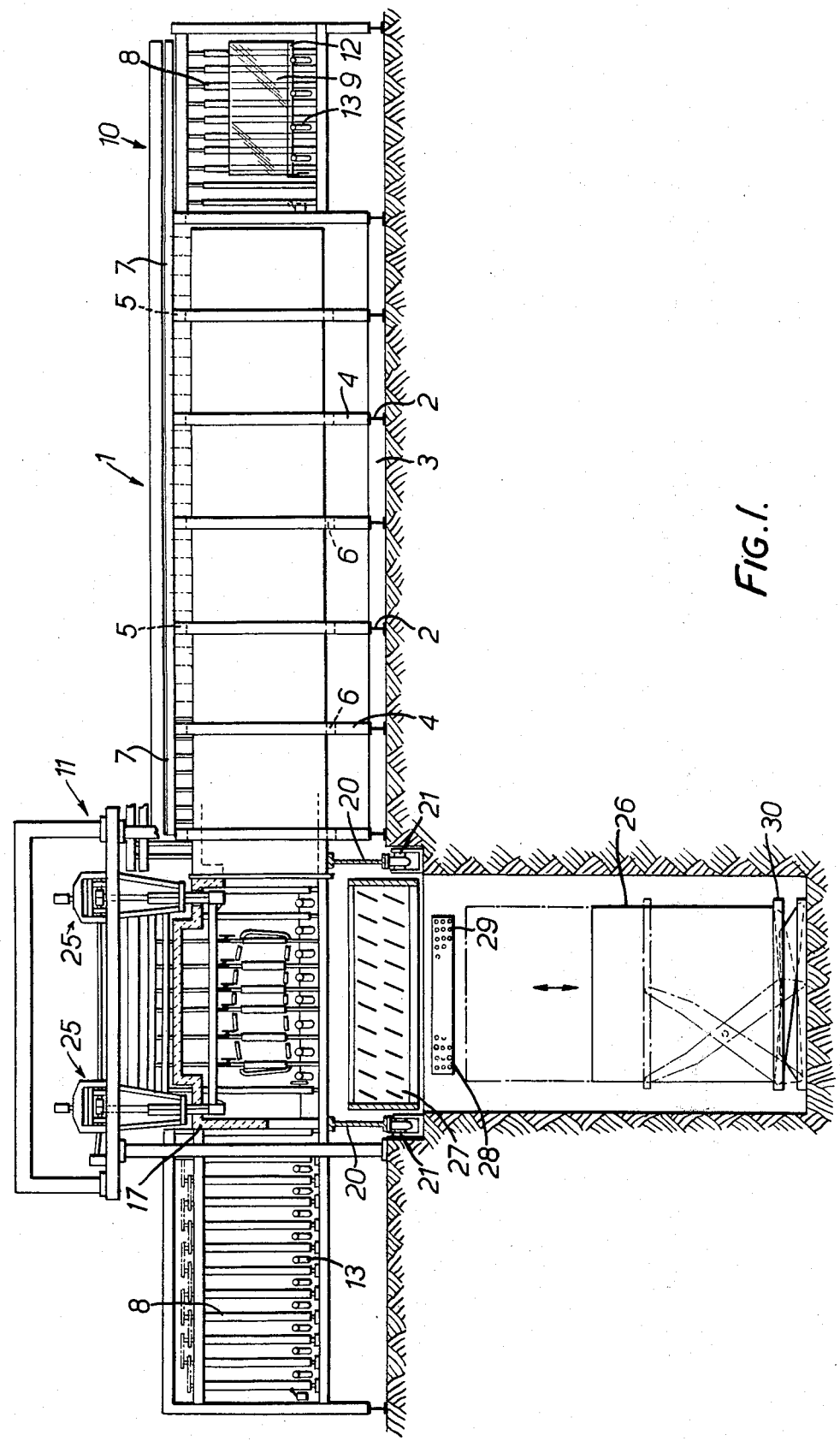
FIG. 1 is an elevation, partly in section, of apparatus according to the invention including a loading station for flat glass sheets, a heating furnace, bending apparatus and liquid quenching apparatus.

FIG. 1 illustrates the general arrangement of apparatus for carrying out the invention, for heating, bending and toughening glass sheets which are conveyed through the apparatus throughout that operation in an upright disposition, that is in a near-vertical disposition during heating, and in a vertical disposition after bending and when being quenched in a chilling liquid.

The furnace chamber is indicated generally at 1 and has a cross-section of rectangular form with a specially shaped floor as will be described, and is supported at an angle to the vertical of about 5° in a basic girder framework which includes base girders 2 which are joined at their ends by cross girders 3. From the ends of the base girders there extend upright girders 4 which are at an angle of for example 5° to the vertical as more clearly shown in FIGS. 4 and 5. The upper ends of the upright girders 4 are connected together by cross girders 5 which are inclined at an angle of about 5° below the horizontal.

The floor of the furnace is supported by cross girders 6 which extend below the lower ends of the upright girders 4 and are shaped to support the shaped floor of the furnace. The downwardly sloping step in the furnace floor which slopes towards the bottom of one side wall permits any cullet which falls to the floor to be collected at outlets near the bottom of the side walls, which outlets are closed by hinged doors.

The furnace 1 is a refractory-lined, metal structure having side walls which extend upwardly from the floor and an integral roof construction which is hung from the upper girders 5. Longitudinal girders 7 fixed along the top of the furnace provide support for gear boxes housing the upper ends of a plurality of spaced-apart, upright, near-vertical rollers 8 which define an inclined support for sheets of glass 9 which are to be conveyed through the furnace 1 for bending and subsequent liquid-quench toughening or annealing.

The rollers 8 are asbestos-covered or of heat-resisting stainless steel and are each mounted at an angle of from 20° to 10° to the vertical e.g. 5°, and form part of a conveyor for the sheets 9 which extends right through the furnace 1 from a loading station indicated generally at 10 to a bending station 11. The rollers are 6.5 cm in diameter and are spaced 19 cm apart in the furnace. The spacing between rollers may be up to 30 cm in the region of the outlet end of the furnace where the glass reaches its final temperature. At the inlet end of the furnace where the glass is at a low temperature, the spacing may be greater, for example 38 cm or more providing there are sufficient rollers to support the whole length of the glass sheet in a stable condition.

The conveyor includes a movable support in the form of a carriage 12 on which the lower edge of the glass sheet 9 is seated, and bottom stub rollers 13 which project through spaces between the upright rollers 8 near the bottom of those rollers both at the loading station 10 and in the furnace 1, and driving means for advancing the carriage 12 through the furnace with the glass sheet 9 leaning against the upright rollers 8.

The bottom stub rollers 13, which are also of heat-resistant stainless steel or asbestos covered, are mounted, in the embodiment illustrated, at acute angle of 50° to the upright rollers 8.

Figure 5:
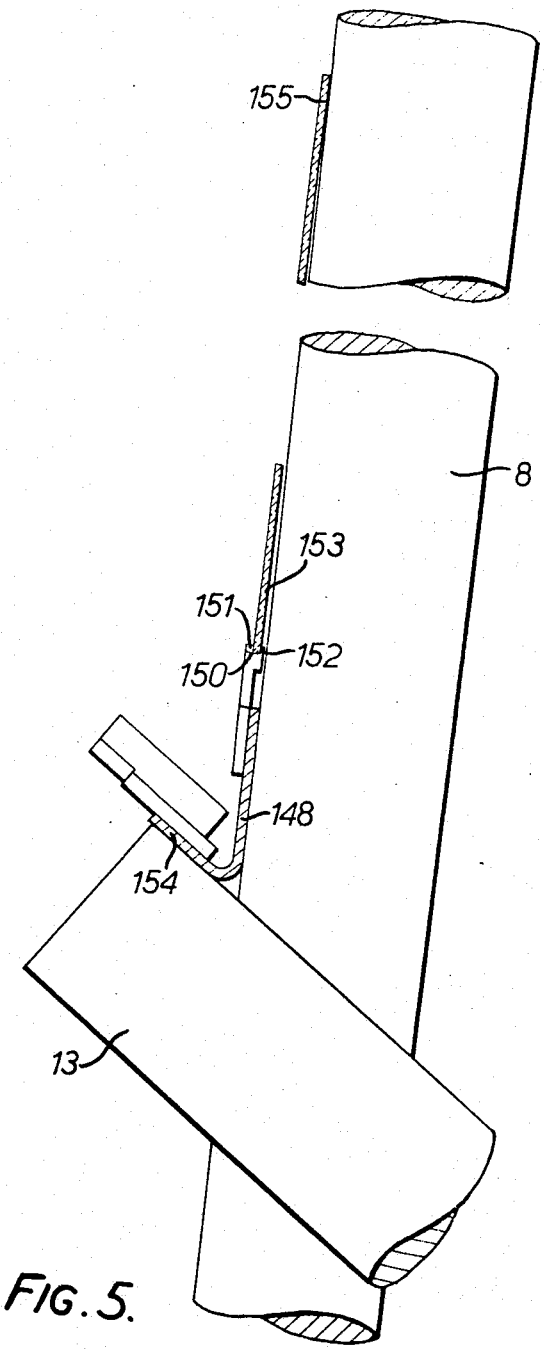
FIG. 5 is a section on line X—X of FIG. 4 also illustrating the disposition of the carriage and the glass sheet relative to the upright rollers and the bottom stub rollers of the furnace.

The carriage 12 is shown in more detail in FIGS. 4 and 5 and is of V-section having faces which are at an angle to each other matching the acute angle between the axes of the upright rollers 8 and the stub rollers 13. These faces of the carriage engage frictionally both the rollers 8 and 13, which are driven at the same speed as will be described, so that the carriage carrying the sheet is advanced through the furnace by the frictional engagement with both the bottom rollers 13 and the upright rollers 8. Initially, only the upper edge of the sheet rests on the surface of the upright rollers 8 but as the sheet is heated during its advance through the furnace the sheet tends to relax against the transient support for the sheet provided by the rotating surfaces of the rollers 8. The bottom edge of the sheet is seated on specially shaped supports on the carriage and is slightly offset on the carriage 12 from the roller surfaces, so that a certain relaxation with deformation only below a predetermined limit can take place while ensuring that the sheet remains in its upright disposition and that the lower edge of the sheet does not become displaced from the carriage.

In operation thermal conditions in the furnaces are set and the time taken by the carriage carrying the glass sheet to traverse the heating zone is also set in dependence on the glass thickness, the height of the glass sheet, the angle of the support rollers to the vertical and the amount of offset of the lower edge of the glass sheet from the support rollers so as to achieve a predetermined temperature condition of the glass, the thermal and time settings being such as to permit the glass sheet as it is heated to relax against the support rollers only by an amount less than the maximum deformation of the glass sheet which is acceptable prior to bending. The heating of the glass sheet as it traverses the heating zone is described in co-pending application Ser. No. 450,459 for "Bending Glass Sheets" filed concurrently herewith, the disclosure of which is hereby incorporated by reference.

Usually the offset distance is about 2 to 4 mm and the maximum acceptable amount of deformation depends on the quality, particularly the optical quality required in the final product. In the case of glass sheets which are to be incorporated in vehicle windscreens, for which the optical requirements are stringent, it may only be acceptable to permit deformation of the glass sheets up to a point in the initial relaxation before the appearance of the bulge. A bulge of up to 0.5 mm may be acceptable.

Where the quality requirements are less critical a bulge greater than 0.5 mm may be permissible, for example up to 4.0 mm.

It has been found that the near vertical angle at which the sheet is initially supported when leaning against the rollers 8 may be in the range 2° to 10° for the heating of sheets of soda-lime-silica glass of thickness in the range 1.5 to 15 mm to a temperature in the range 580° to 680°C or even 700°C which temperature range encompasses the usual temperature to which soda-lime-silica glass is heated prior to bending or toughening.

The upright, near-vertical rollers 8 are supported at their lower ends by self-aligning bearing blocks which are carried by parallel girders which run beneath the furnace floor and are supported on the specially shaped cross-girders 6.

The first 10 upright rollers 8 of the plurality of upright rollers constitute the loading station 10, and five bottom stub rollers 13 are respectively located between alternate spaces between the upright rollers 8.

Figure 9:
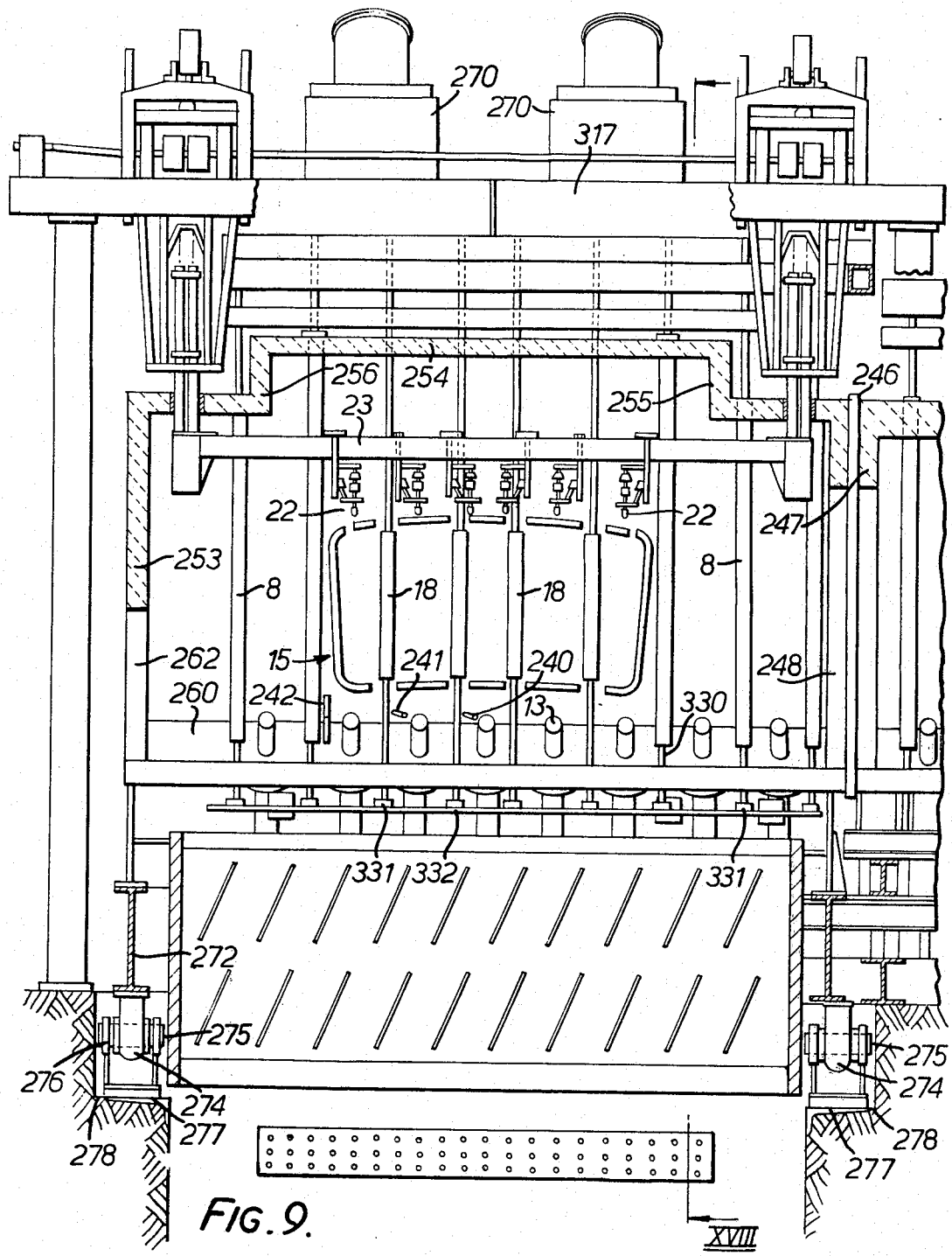
FIG. 9 is a more detailed view of part of FIG. 1 illustrating generally a tilting box which encloses male and female bending dies and is mounted to be tilted from an angle matching the angle of the upright rollers in the furnace to a horizontal disposition above thermal treatment apparatus through which bent glass sheets are lowered, FIGS. 10A and 10B together constitute a part-sectional view of the tilting box on line XVIII—XVIII of FIG. 16.
Figure 10A:
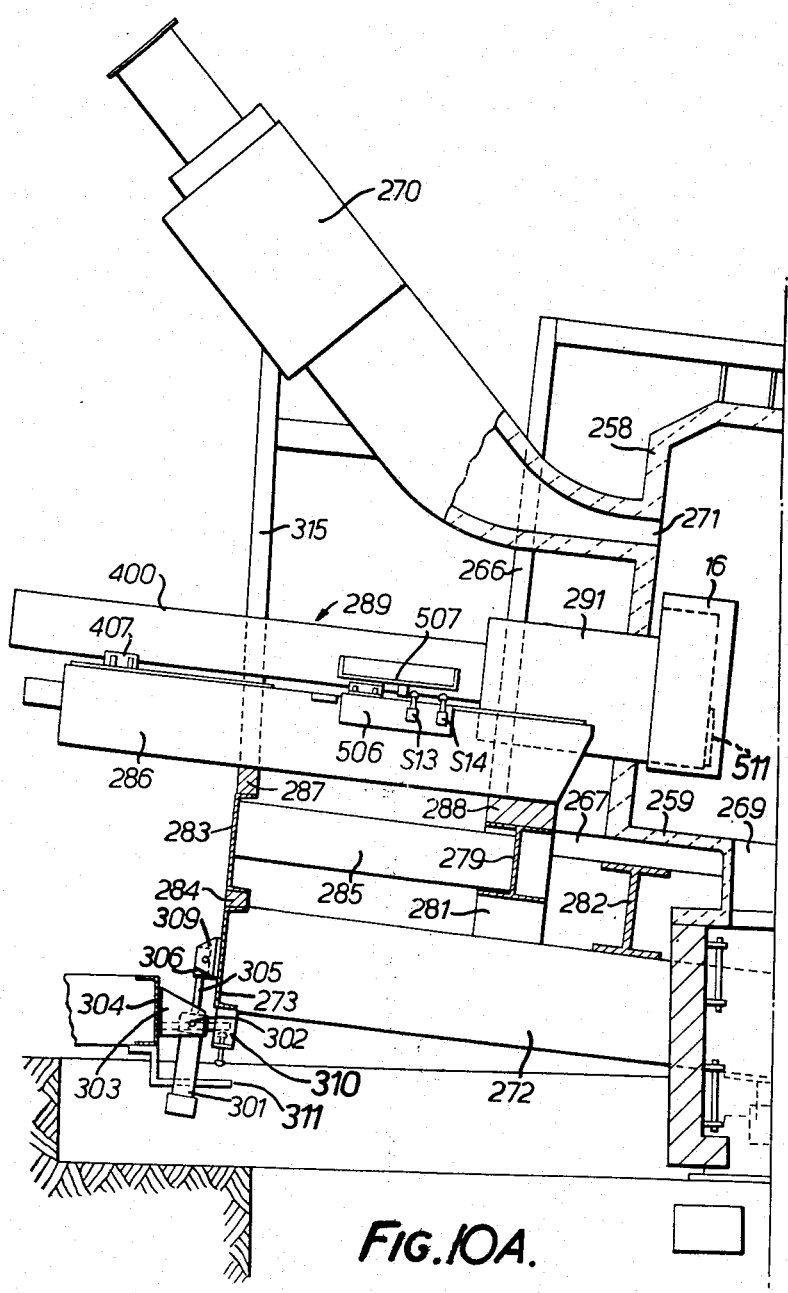
Figure 10B:
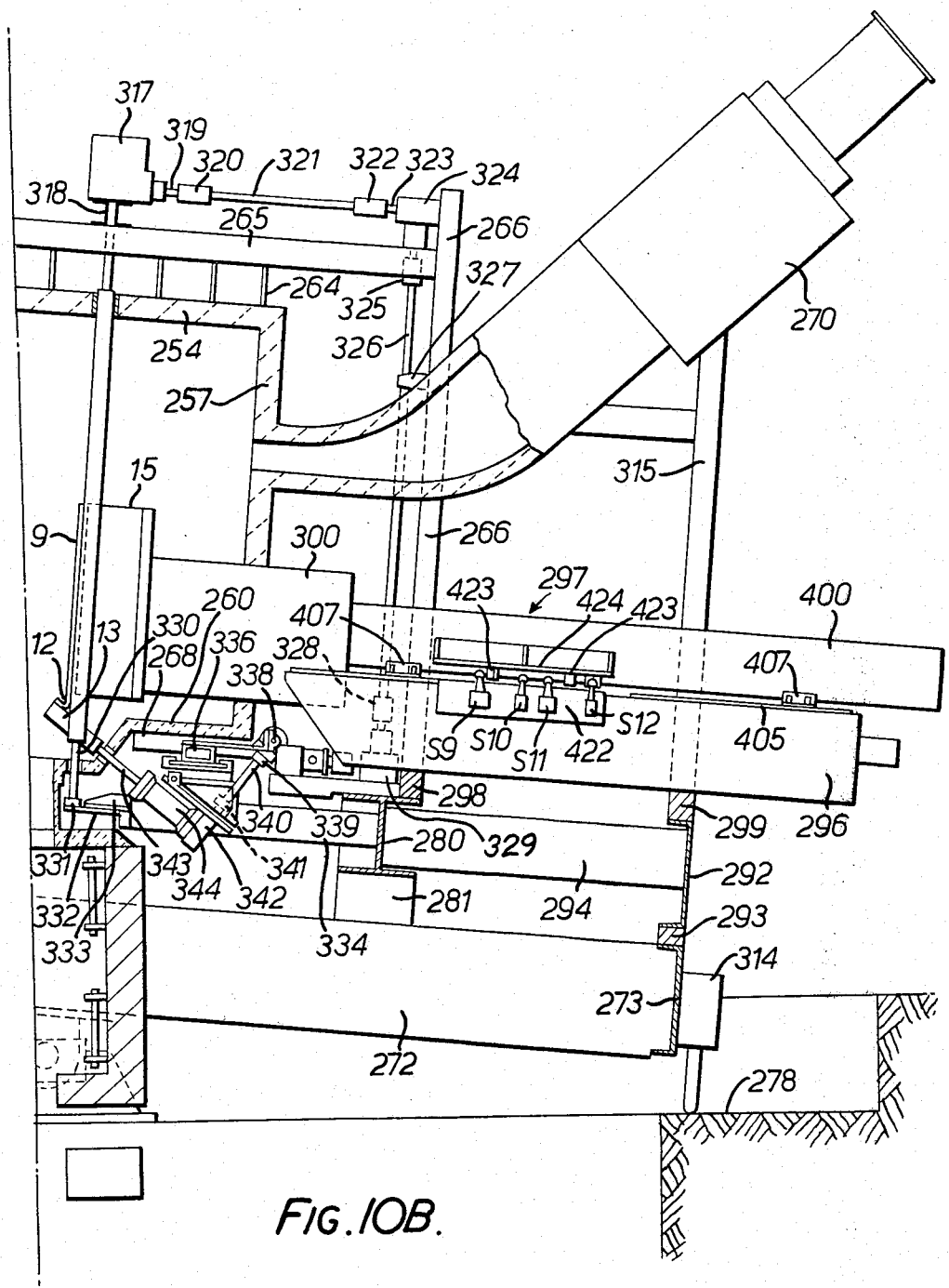

At the bending station there are horizontally disposed bending dies 15 and 16 which are shown more particularly in FIGS. 9, 10A and 10B. The female die 15 is a ring frame die which co-operates with a male die 16 having a continuous bending surface, indicated in more detail in FIG. 11. The dies illustrated are rigid dies but articulated wing dies with pivoting mechanism of known kind may be employed for bending complex windscreen shapes. The dies are located in a tilting box 17 which is a refractory lined metal structure defining a heated chamber enclosing the bending dies, and through which there extends a conveyor comprising upright rollers 8 and bottom stub rollers 13 similar to those in the furnace and forming an extension of the conveyor. The upright rollers 18 in the tilting box 17 in the area occupied by the bending dies have short support surfaces so that the female die ring frame can move through and beyond the rollers.

Beyond the outlet from the tilting box 17 there are further upright rollers 8 and bottom stub rollers 13 which form an extension of the conveyor for receiving each carraige 12 after the sheet which it supported has been lifted from the carriage for bending between the bending dies.

The drive to all the rollers at the loading station, in the furnace and in the tilting box is from the same motor. The rollers beyond the outlet from the tilting box have a separate drive and all the drives are controlled in the manner which will be described so that a glass sheet 9 can be fed slowly from the loading station towards the entrance to the furnace 1, thereafter accelerated into the furnace and is advanced through the furnace at an appropriate lower furnace creep speed as the glass is heated. At the end of the set heating time in the furnace the glass is accelerated from the furnace onto the short upright rollers 18 between the bending dies where the carriage is brought to rest with the hot glass sheet exactly located between the dies.

The tilting box is heated by gas burners, shown in FIG. 9, to the same temperature as the glass achieves during its passage through the furnace so that the bending dies are at the same temperature as the glass when it is presented to the dies for bending.

The tilting box 17 is mounted on a massive rocking girder frame including bottom beams 20 which are mounted on central pivots 21. An hydraulic ram attached centrally to one end girder of the rocking frame is operable to tilt the frame from an angle of about 5° to the horizontal, in which position the rollers 18 are aligned at the same angle to the vertical as the rollers 8 in the furnace, to a horizontal position of the frame in which the rollers 18 are vertical.

Initially the box is in its tilted position and the male bending die is moved into position as the carriage carrying a glass sheet enters the tilting box and as soon as a hot glass is located between the dies the female die 15 moves through the rollers 18 to press the sheet against the male die and the rocking frame is tilted to its horizontal position as bending of the sheets proceeds. During movement of the female die the glass sheet is lifted from the carriage by fingers on the female die which pass beneath the lower edge of the glass sheet and lift the sheet. When the rocking frame is horizontal, a tong bar 23 carrying glass-gripping tongs 22 is lowered from a hoist mechanism indicated at 25 which can itself be raised and lowered.

Provision is made for the tongs 22 to engage in recesses in the upper edges of the dies 15 and 16, so that they can grip the upper edge of the glass sheet as it is held between the bending dies.

When the glass sheet has been lifted from the carriage 12, the carriage is accelerated out of the tilting box on to the exit conveyor 8 before the rocking frame is rocked to its horizontal position when the dies open and the glass, now suspended vertically from the tongs, is lowered through a mouth in the bottom of the box for further treatment.

During its transverse through the furnace 1 the glass is heated to bending temperature for example 610°C at which temperature the glass can be satisfactorily bent and engaged by the tongs 22 without having become so soft as to endanger the finish of the glass surfaces during the bending operation.

When the bent glass is to be toughened, especially when a high strength glass is required, it is desirable to quench the glass from a higher glass temperature, e.g. 680°C, and in the embodiment illustrated in FIG. 1 the bent glass is reheated before it is quenched in a chilling liquid contained in a quench tank 26 which is located in a pit beneath the tilting box 17.

Just beneath the exit mouth in the bottom of the tilting box the glass passes between two banks of electric heaters 27 mounted in a pattern as illustrated facing both surfaces of the glass. During the passage of the glass downwardly between these heaters the glass at its bending temperature, e.g. 610°C, is heated throughout its thickness to a pre-quenching temperature nearer to the softening point of the glass e.g. 680°C. The bent glass may be lowered at uniform speed so as to maintain as near as practically possible uniform temperature throughout the whole glass sheet. Alternatively the glass may be accelerated as it is lowered between the heaters to produce in the glass a uniform temperature gradient from a high temperature at the bottom of the sheet to a lower temperature at the top of the sheet.

Figure 11:
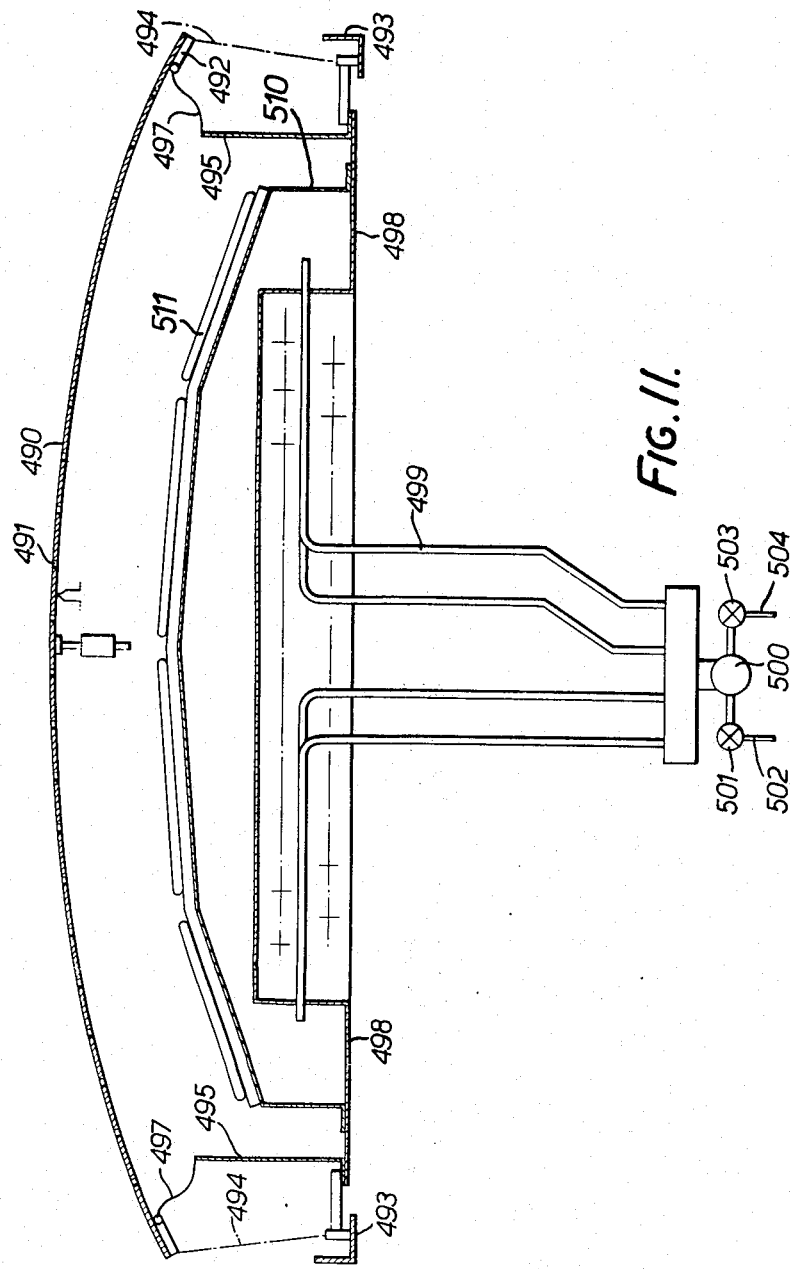
FIG. 11 is a horizontal cross-section through the male bending die, FIGS. 12A, 12B and 12C together form an overall view in elevation of a tong bar from which tongs are suspended for gripping the upper edge of a glass sheet between the male and female bending dies, and of the hoist mechanism from which the tong bar is suspended, FIGS. 13A, 13B and 13C together show an end elevation of a part of the joist mechansim and the tong bar suspension.

Such a temperature gradient may be induced in the glass sheet prior to bending by running lower sections of heaters on the furnace walls hotter than upper sections, or by locating the lower sections of heaters in closer proximity to the glass as described with reference to FIGS. 3 and 10A. For example the bottom of the furnace may be at 800°C, middle areas of the furnace walls at 750°C and the upper part of the furnace at 700°C. The male bending die 16, FIG. 11, is then heated by means of internal heaters 511 mounted internally to have a temperature distribution matching that induced in the glass sheet by such a furnace, as will be described with reference to FIG. 11.

Below the boost heaters 27 are two blowing boxes 28 both of which are supplied with cooling air at ambient temperature, for example about 30°C, which is projected through nozzles 29 in the boxes uniformly towards both surfaces of the glass sheet. This precooling of the glass surfaces after boost heating produces immediate temperature gradients from the central core to the surfaces of the glass. The core of the glass remains at about the temperature achieved between the boost heaters, and the pre-cooling of the glass surfaces is such that while the glass temperature is still above the strain point of the glass, the glass sheet is immediately quenched in a chilling liquid before these temperature gradients decay.

As the glass is being lowered from the bending dies the tank 26 of chilling liquid is raised on a scissors-lift platform 30 which stands in the bottom of the pit. The tank 26 is raised until the top of the tank is located just below the bottom of the blowing boxes 28 with the surfaces of the chilling liquid in the tank at a predetermined small distance from the bottom nozzles 29 of the blowing boxes. The bent glass sheet in which core-to-surface temperature gradients exist as just described is immediately quenched in the chilling liquid as it passes from the ambience of the cooling air into the surface of the chilling liquid.

The chilling liquid is usually a mineral oil for example CYLREX FM (Trade Mark) and may have added to it a minor proportion of a low boiling point additive for example up to 1% by weight of toluene or carbon tetrachloride.

As the glass is immersed in the liquid in the tank 26 it comes to rest on a frame immersed in the tank, which frame is attached to the bottom one of the blowing boxes. The tongs are opened to release the glass on to the frame and after a time to permit the glass to cool in the liquid the tank is lowered, the glass is removed from the frame and degreased, and the toughened glass is stacked in a rack to complete its cooling to ambient temperature.

In another method of operation the tank 26 is not raised, the bent glass sheet comes to rest in the frame and remains in the frame for cooling in ambient air to produce an annealed glass sheet. An annealing enclosure may be moved on a horizontal track into position to receive a hot bent glass sheet.

Figure 2:
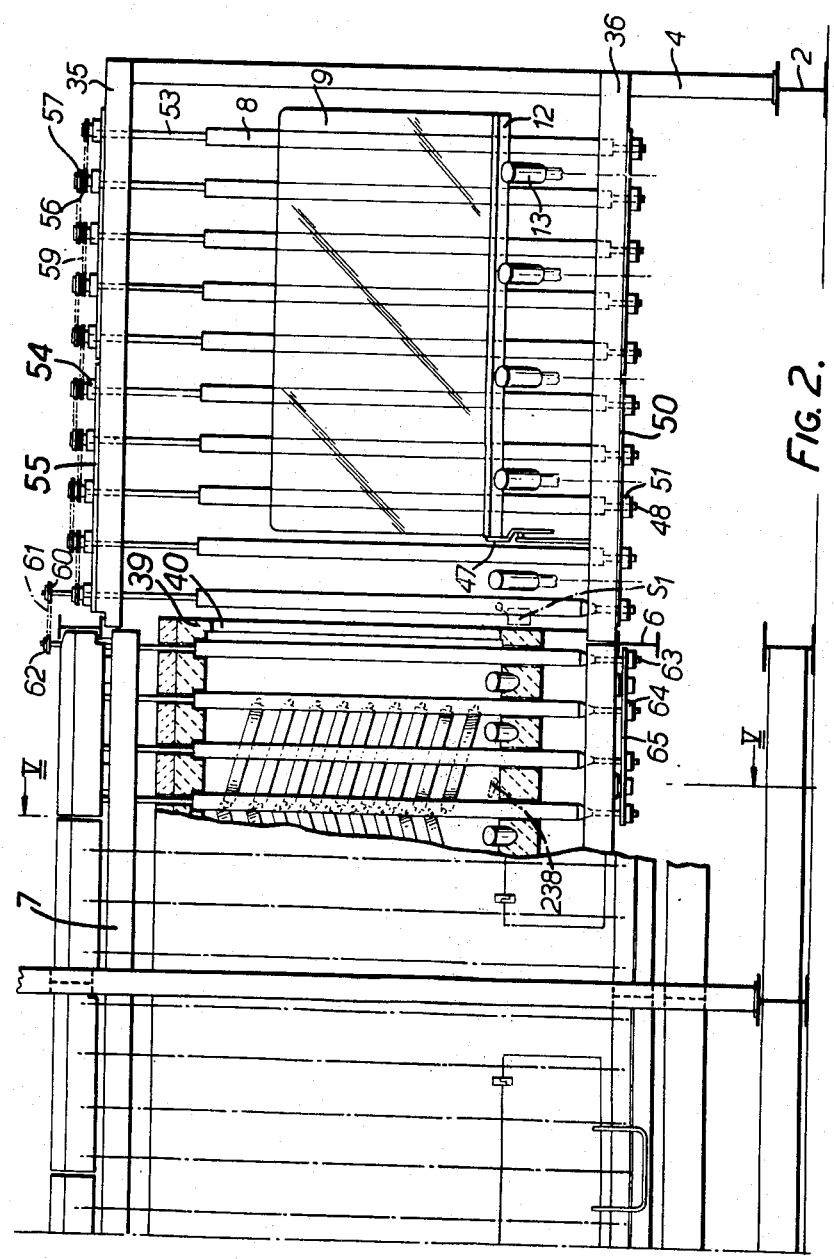
FIG. 2 is a side elevation of the loading station and the inlet end of the furnace of FIG. 1, partly broken away to illustrate upright support rollers and associated bottom rollers at the loading station and in the furnace.

Provision may be made for alternatively annealing and quenching sheets in succession as they are lowered from the bending dies so that successive sheets of a pair are respectively annealed and toughened. These sheets have been heated and bent under identical conditions and have matching dimensions and are emminently suitable for laminating together in the manufacture of a laminated windscreen. FIGS. 2 and 3 illustrate in more detail the construction and operation of the loading station and the furnace.

The first 10 upright rollers 8 of the conveyor constitute the loading station as illustrated at the right hand end of FIG. 2. These rollers are of heat-resisting stainless steel and are mounted at 20 cm intervals between upper horizontal girders 35 and lower horizontal girders 36 which form extensions of the girder construction supporting the furnace 1. The girders 35 and 36 at the loading station are connected to an end frame comprising a base girder 2 and an upright which is inclined to the vertical at the same angle of about 5° as the rollers 8 and which is supported by struts. The end wall of the furnace at the loading station is indicated at 39 and an entrance mouth 40 to the furnace is formed through the end wall 39 in alignment with the upright rollers 8 and includes an enlargement at the bottom of the mouth 40 and aligned with the stub rollers 13 to permit passage of the carriage 12 on the conveyor into the furnace. Flexible asbestos cloth sealing strips, not shown, are mounted in the upright edges of the furnace mouth 40.

Figure 3:
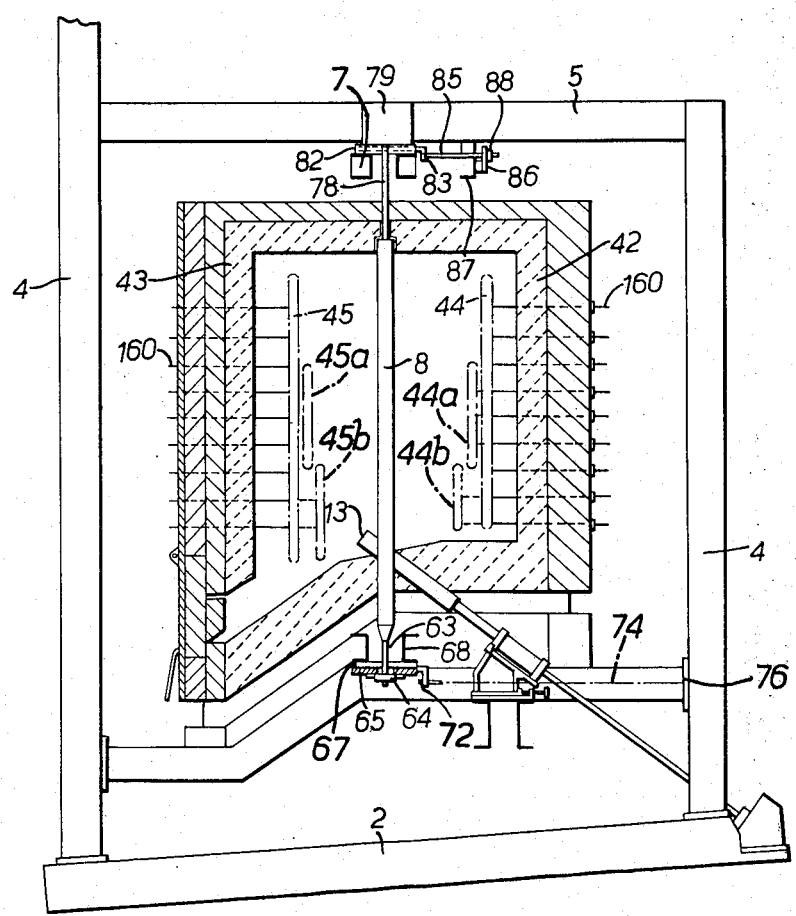
FIG. 3 is a section on line V—V of FIG. 2, showing the disposition of heaters in the furnace.
Figure 6:
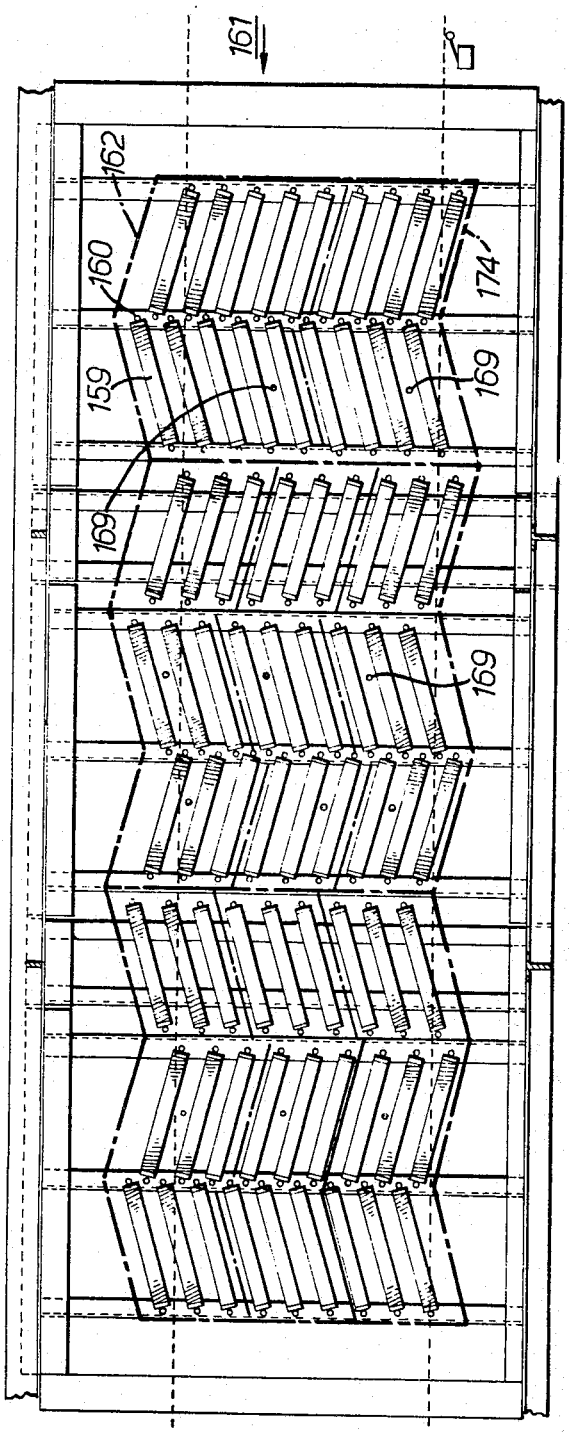
FIG. 6 illustrates an arrangement of electrical heaters on one side wall of the furnace.

Side walls 42 and 43 of the furnace 1 carry banks of electrical heaters 44 and 45, FIG. 3, which heater banks are illustrated in greater detail in FIGS. 6 and 8. These heaters face opposite sides of the path of travel of each glass sheet 9 through the furnace and are connected together in groups which are individually controlled as will be described.

At the loading station, FIG. 2, the carriage 12 is located in position by a rectractable carriage stop 47 against which the front end of the carriage 12 bears so that the carriage is held in sliding engagement with the rollers which are being driven at an initial slow speed and when the stop 47 is retracted movement of the carriage commences from the loading station into the furnace. A cold flat glass sheet 9 loaded on to the carriage 12 leans against the upright rollers 8 at the loading station. The sheet, being cold is not deformable and the necessity for exact alignment of the rollers 8 and 13 at the loading station is not as critical as is the need for their exact alignment in the furnace and the tilting box. Therefore the rollers 8 which are mounted between the beams 35 and 36 at the loading station are not angularly adjustable but are set in fixed bearing blocks at the angle of the conveyor, in this embodiment 5° to the vertical.

The lower ends of the upright rollers 8 at the loading station are formed with stub shafts 48 which extend downwardly between the girders 36 and through apertures in a plate 50 which is bolted to the bottom of girders 36. Beneath the plate 50 there are carried self-aligning bearing blocks 51, one for each of the rollers 8. The bearing blocks 51 have lugs which are bolted to the plate 50 and the stub shafts 48 extend downwardly into and through the bearing blocks 51.

At their upper ends the upright rollers 8 at the loading station are formed as integral elongated stub shafts 53 which extend upwardly between the beams 35 and are each housed in a self-aligning bearing block 54. The bearing blocks 54 are bolted by lugs to a support plate 55 which is fixed on top of the girders 35. Each of the shafts 53, except that of the roller 8 nearest to the entrance to the furnace, extends upwardly through its bearing block 54 and carries a sprocket wheel block comprising two sprocket wheels 56 and 57. The sprocket wheels for adjacent rollers are connected together by means of drive chains 59.

The elongated stub shaft 53 of the roller 8 nearest to the inlet end wall 39 of the furnace is longer than the stub shaft 53 of the other rollers of the loading station, and carries a single sprocket wheel 56 and on its upper end a main drive sprocket 60 which is connected by a drive chain 61 to a sprocket 62 on the upper end of the first of the upright rollers 8 within the furnace. The rollers 8 at the loading station are thus driven from the same drive as the rollers 8 constituting the rest of the conveyor in the furnace.

Within the furnace it is important to ensure accurate alignment of the surfaces of the rollers 8 relative to each other so that the surfaces of the rollers which provide transient support for the glass sheet all lie in the same plane which is inclined to the vertical at the preset angle, for example 5°. In order to effect this, and as described in the above mentioned co-pending application Ser. No. 450,459, the rollers 8 within the furnace are mounted in alternating groups of four and three rollers each, with the rollers spaced about 20 cm. apart, and the exact location of the lower bearings of each group of adjacent rollers is adjustable horizontally at right angles to the direction of the conveyor. The upper ends of the rollers of each group are mounted in a gear box whose position is also adjustable horizontally at right angles to the direction of advance of sheets of glass along the conveyor. The adjustment of the disposition of the bearing blocks and the gear boxes relative to each other permits alignment of all the upright rollers 8 in the furnace at the required angle to the vertical.

The lower end of each roller 8 in the furnace is formed as a stub shaft 63, which is supported in a self-aligning bearing block 64 which is fixed in a plate 65 which is carried by dove-tail slides which slide in slide beds 67 which are fixed beneath parallel girders 68 which run longitudinally beneath the furnace floor and are supported on the specially shaped cross girders 6 which support the furnace floor. This arrangement is shown in FIG. 3.

Each of the dove-tail slide blocks 66 has an end lug 72 which is drilled and threaded to receive the threaded end of an adjusting shaft 74 whose other end extends through an apertured locating block which is bolted to a cross girder 76 extending between the lower ends of the upright girders 4 along one side of the furnace. The outer end of the shaft is threaded and is fitted with lock nuts on either side of the loading block. Each of the plates 65 is carrying the bearing blocks 64 for a group of rollers has two V-slides and the adjustment of the two shafts 74 permits adjustment of the disposition of the lower ends of that group of rollers.

The upper ends of the group of rollers 8 are of reduced diameter and the elongated stub shafts 78, FIG. 3, extend into a gear box 79 mounted by anti-vibration mountings on dove-tail slides which are located in slide beds 82 which are mounted on top of the longitudinally extending girders 7. In the same way as the slides for the lower bearings of the rollers, each of the dove-tail slides 81 has an end lug 83 which is drilled and threaded to receive the threaded end of an adjustment shaft 85. The other end of the shaft 85 extends through an apertured locating plate 86 which is mounted on a girder 87 which runs longitudinally of the furnace beneath the cross girders 5. The outer end of the shaft 85 is threaded and is fitted with lock nuts 88 on either side of the locating plate 86.

Each of the gear boxes 79 is seated on two such slides and rotation of the shafts 85 of the gear box moves the dove-tail slides 81 in their slide beds 82 so that the position of the gear boxes 79 can be adjusted, as required relative to the adjustment of the bearing blocks 64 for the lower ends of the rollers to ensure that the rollers 8 driven by that gear box are at the required predetermined angle to the vertical.

The position of the gear box 79 for each group of rollers is adjustable in conjunction with adjustment of the plate 65 carrying the bearing blocks for the lower ends of the rollers so that in setting up the furnace all the rollers 8 of the conveyor extending through the furnace can be accurately aligned so that the glass supporting surface of each of the rollers 8 is at the same angle to the vertical, for example 5°.

The bottom stub rollers 13 define a track for the movable carriage 12 which carries the glass sheet 9 through the furnace and these bottom stub rollers project through spaces between the upright rollers 8 along the whole length of the conveyor and are mounted at an acute angle, in this embodiment 50°, to the upright rollers 8.

The five bottom stub rollers 13 which support the carriage 12 at the loading station are shorter than those that project inwardly into the furnace, and are located in alternate spaces between the upright rollers 8.

GLASS SUPPORT CARRIAGE

The carriage 12 which constitutes the movable support for a sheet of glass 9 is illustrated in more detail in FIGS. 4 and 5. The carriage is made of sheet steel bent to an angle so as to provide two faces which match the acute angle between the upright rollers 8 and the stub rollers 13. The upright face 148 of the carriage is the longer face and carries two support plates 149, the upper edge of each of which is widened to provide a support shoulder 150 whose upper surface 151 is provided with a non-slip refractory coating. The rear edge of the upper surface 151 of each shoulder 150 is formed with an upstanding land 152 of width which predetermines the minimum offset distance of the lower edge 153 of the glass sheet 9 from the supporting surface of the upright rollers 8 when the carriage is in position for conveying the sheet through the furnace with the face 148 of the carriage bearing against the supporting surfaces of the rollers 8 and with the lower shorter face 154 of the carriage supported on the bottom stub rollers 13. FIG. 5 illustrates how the upper edge 155 of the glass sheet rests against the rollers 8 when the glass is loaded at the loading station and FIG. 4 shows how the support shoulders are adapted to the particular shape of the sheet of glass to be bent. The shape of the glass sheet matches the styling of the vehicle in which the sheet is to be embodied.

By reason of common drive to the rollers 8 and 13 from the single hydraulic motor 103, and by choice of suitable gearing with similar frictional engagement of the faces 148 and 154 of the carriage with the upright rollers and the stub rollers 13 respectively, the movable carriage is always advancing with the same linear speed as the surface linear speed of the upright rollers 8 against which the sheet of glass rests and which provide transient support for the upper edge of the glass sheet.

The carriage also carries a stop member 156 at its front end for abutment against the retractable carriage stop 47 at the loading station as shown in FIG. 2 and for eventual abutment against a second carriage stop in the tilting box 17 when the glass sheet is correctly located between the bending dies. Also mounted on the carriage is striker 157 near the front end of the carriage for engaging a limit switch S1 mounted just outside the furnace at the loading station. A further striker 158 is mounted on the carriage at about a midway location to engage an actuating member in the furnace for a limit switch S2 which forms a part of a control system for regulation of the speed of travel of the carriage through the furnace when the whole of the glass sheet is within the furnace.

FURNACE HEATERS

Figure 7:
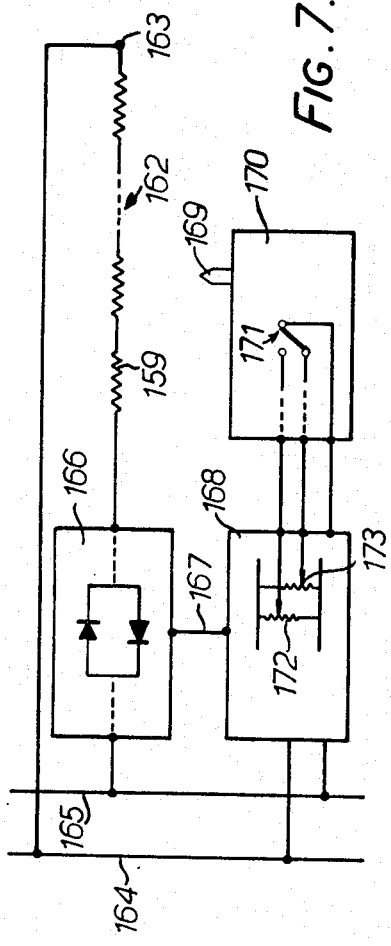
FIG. 7 shows schematically a thyristor-controlled circuit for controlling current supply to a group of heaters of FIG. 6.

FIG. 6 illustrates the way in which the electric heaters indicated at 44 in FIG. 3 are mounted on the furnace side wall 42 facing the back of the upright rollers 8. Each of the heaters is an electric resistance wire heater 159 the wire being wound on a ceramic rod which is carried by two connection rods 160 which extend through the side wall 42 of the furnace. Current is supplied through these connection rods 160. The heaters 159 are arranged in a chevron pattern and the heaters are connected together in series in groups which groups are de-limited by the chain lines in FIG. 11. For example the upper group of heaters first encountered by the glass which is advanced into the furnace in the direction of the arrow 161, is indicated at 162 and comprises ten heaters 159 which are connected together in series as illustrated in FIG. 7. One end 163 of the series connection of the heaters is connected to one line 164 of a power supply. The other supply line 165 of the power supply is connected to a thyristor control circuit 166 of conventional design which controls the flow of current through the series connected group of heaters 159 in response to firing pulses supplied to the trigger electrodes of the thyristors on lines indicated by the firing pulse line 167 which is connected to a firing pulse generating circuit 168 which is also supplied with power from the lines 164 and 165.

A control thermocouple 169 is mounted in the furnace within the limits of the group of heaters 162. This thermocouple is connected into a temperature control circuit 170 of conventional design and controls a simple on/off switch indicated by the two way switch 171 to switch into the blocking oscillator of the firing pulse generator circuit 168, control by one or other of two potentiometers 172 and 173.

The setting of the potentiometers 172 and 173 are such as to give, in known manner, respectively high and low levels of power dissipation in the group of heaters 162 so that in response to the temperature in that part of the furnace within the limits of the group of heaters 162 as sensed by the thermocouple 169, the level of power dissipation can be switched between the high and low levels in order to maintain the sensed temperature at a desired value set by a set point adjustment provided in known manner by adjustment of a potentiometer in the control circuit 170.

Eight series connected heaters are arranged in chevron fashion in a second group 174 at the inlet end of the furnace lying below the group 162. Thereafter the heaters are arranged in two sets of three groups, each group consisting of nine heaters connected together in the series and each having an associated control thermocouple 169 and being supplied through a thyristor control circuit under the control of the appropriate thermocouple 169 and temperature control circuit as illustrated in FIG. 7

Operation of each group of heaters can be set individually by the set point adjustment in the associated temperature control circuit. For example for heating a sheet of glass 2 mm thick to a bending temperature of 590°C, which is attained substantially uniformly throughout the whole of the glass sheet, the set points of the temperature control circuits may be such that the temperature at the thermocouple 169 within the group of heaters 162 is 700°C, and the temperature at the thermocouple 169 within the group 174 is 750°C. Of the subsequent groups of heaters the temperatures at the thermocouples 169 are 700°C for the upper groups, 725°C for the middle groups, and 750°C for the lower groups.

FIG. 8 illustrates the electrical heaters 45 which are mounted on the side wall 43 of the furnace facing the glass sheet leaning against the rollers 8. In this drawing the direction of glass movement 161 is shown from the left hand end of the Figure. The heaters 159 are wire-wound heaters on ceramic tubes of the same kind as illustrated in FIG. 6 and are mounted on connection rods 160 which extend through the side wall 43 of the furnace. The heaters are divided up into groups which are indicated by chain lines and are similar to the groups of heaters in FIG. 6 with the addition of a further group of heaters 177 each with a control thermocouple 178. This additional group of heaters comprises a row of six heaters extending along the bottom of the longer side wall 43 of the furnace just above the cullet clearance exit passages. Each group of heaters is controlled by a thyristor control circuit of the kind illustrated in FIG. 7 with a simple on/off switching arrangement. The temperature at the thermocouple 178 in the upper group of the two groups at the entrance end of the furnace is maintained at 700°C and the lower group at 750°C when heating a 2 mm glass sheet to 590°C for bending as described above. The bottom temperature at the control thermocouple 178 in the bottom row of heaters 177 is at 750°C, and in the upper, middle and lower groups of heaters of the further arrangements of groups of heaters as illustrated the temperatures at the control thermocouples 178 are respectively controlled at 700°C and 750°C.

An alternative arrangement for the middle and lower groups of heaters is indicated at 44a, 44b; 45a and 45b in FIG. 3. The close proximity of the lower groups 44b and 45b to the glass and the median position of the middle groups 44a and 45a produces a top-to-bottom temperature gradient in each sheet with the lower edge of the sheet at a higher temperature than the upper edge.

Control of the speed of traverse of the carriage carrying a glass sheet through the furnace is described in detail in the above mentioned co-pending application Ser. No. 450,459.

FIG. 5 illustrates how the upper edge 155 of the glass sheet rests against the near-vertical support rollers 8 when the cold sheet 9 is loaded on to the support carriage 12 at the loading station and during the initial part of the heating of the glass. As the glass is heated during its travel through the furnace and the glass approaches the temperature in the range 580° to 660°C to which it is to be heated, the glass becomes sufficiently softened to relax against the support rollers 8, and could become unacceptably deformed if it were maintained at that temperature for too long.

Initially the upper part of the sheet relaxes against the rollers 8 and the length of effective supporting surface of the rollers 8 which extends downwardly below the top edge of the glass sheet must always be sufficient to accommodate permissible relaxation.

A timer in the control circuit for the roller drive is set so that the glass has reached its desired temperature which, in one manner of operation, is substantially uniform over the whole sheet and through its thickness by the time the hot sheet is accelerated out of the furnace into the tilting box, before the amount of deformation of the sheet by initial relaxation of the upper part of the sheet against the rollers 8, followed, if acceptable, by outward bulging of the lower part of the sheet as described above, exceeds the limits of acceptable deformation of the sheet.

The furnace heater temperature settings of from 0.025 to 0.06 m/sec. is readily achieved in this way.

Other settings of furnace temperature may be employed as set out in Table I.

TABLE I

| Heater Sections Temperature (°C) | | | Mean Furnace Temperature (°C) |
|---|---|---|---|
| 680 | 705 | 730 | 710 |
| 700 | 725 | 750 | 730 |
| 720 | 745 | 770 | 750 |
| 780 | 805 | 830 | 810 |

At any particular mean furnace temperature the time taken for a sheet to reach a required final temperatue is dependent on its thickness, and examples of operation for a range of glass thicknesses from 2.2 to 15 mm and of heating times required to achieve a final glass temperature in the range 580° to 700°C, are described in detail in the above mentioned co-pending application Ser. No. 450,459.

TILTING BOX

The tilting box 17 which is illustrated in FIGS. 9, 10A and 10B, defines a chamber in which the bending dies are enclosed, and comprises the inlet end wall 248, an exit end wall 253, a roof 254 formed with a step 255 leading down to the top of the inlet end wall 248 and a step 256 leading down to the top of the outlet end wall 253. The depth of each of the steps is adjustable to accommodate adjustments of the hoist mechanism for different heights of glass sheets as will be described with reference to FIGS. 12 and 13.

The tilting box further comprises a rear wall 257 and a front wall 258 and floor parts 259 extending rearwardly from the bottom of the front wall 258, and 260 extending forwardly from the bottom of the rear wall 257.

There is a vertical elongated entrance to the chamber formed in the inlet end wall 248 and an exit 262 formed in the outlet end wall 253 through which exit the carriage 12 is discharged after the glass sheet being bent has been lifted off the carriage and is being bent between the bending dies. The exit 262 leads to the extension 8 of the conveyor shown at the left hand side of FIG. 1.

The roof 254 is suspended by hangers 264 from a support structure including a cross beam 265 extending between vertical pillars 266.

The parts 259 and 260 of the floor are supported on floor support girders 267 and 268, and define between them a mouth 269 in the floor of the furnace through which a bent glass sheet can be lowered. The walls, roof and floor parts of the tilting box are fabricated with an outer steel shell lined with refractory material.

The chamber defined within the tilting box 17 is heated to the temperature of the glass which enters the tilting box from the furnace so that the bending dies which are enclosed within the tilting box are at the temperature of their environment and are therefore at about the same temperature as that of the glass sheet when it enters the tilting box. The temperature within the tilting box is maintained by gas burners indicated at 270 which are connected by ducts to inlet slots 271 formed in the front and rear walls 257 and 258 of the tilting box. There are four gas burners 270 feeding four slots 271, two in each of the front and back walls and each of the burners is controlled by a thermocouple fixed in the male die as near to its bending surface as possible, to ensure the maintenance of a uniform bending temperature, in the range 580° to 650°C for example 610°C, within the tilting box. The burners 270 are connected by flexible ducts to gas and combustion air supplies, including means controlled by the thermocouple in the male die to vary the air:gas ratio fed to the burners.

The gas burners maintain a positive pressure of hot gases in the tilting box and hot gases flow downwardly through the exit mouth beneath the box and meet uprising gases. A pressure balance usually exists just below the boost heaters 27.

The massive rocking frame, on which the tilting box is mounted, which frame is indicated at 20 in FIG. 1, comprises side girders 272 and end girders 273 welded to the end of the side girders 272. Each of the side girders 272 is seated on and welded to a pivot block 274 which carries trunnions 275 which are mounted in bearing blocks 276 which are seated on a base support plate 277 which provides the upper surface of a ledge 278 which is cut into the side walls of the pit. The rocking frame is balanced on the trunnions 275 as is the whole of the tilting box construction and its associated equipment carried by the rocking frame so that the frame 272, 273 can be readily tilted from horizontal to the tilted position at about 5° to the horizontal which is illustrated in FIG. 10.

Cross girders 279 and 280 extend across and above the rocking frame between the side girders 272 being mounted on the side girders by end brackets 281.

A cross girder 282 is seated directly on the side girders 272 of the rocking frame and the floor support girders 267 are seated on the cross girder 282.

At the left-hand end of the rocking frame as viewed in FIG. 10, a plate 283 is supported by spacer blocks 284 on the end girder 273. The plate 283 is a short plate centrally mounted on the end girder 273, and stiffening girders 285 extend from the plate 283 to the cross beam 279.

Mounted above the plate 283 and the cross beam 279 are a pair of parallel support beams 286 which are respectively mounted by support blocks 287 and 288 on the plate 283 and the cross beam 279. The parallel support beams 286 support an actuator unit 289 for the male die 16 which is mounted on a die mounting assembly 291.

Similarly at the right-hand end of the rocking frame a central plate 292 is mounted by support blocks 293 on the upper face of the end girder 273. The plate 292 is fixed by stiffening beams 294 which extend between the plate 292 and the cross beam 280, and a pair of parallel support beams 296 for an actuator unit 297 for the female die 15 are carried on the cross beam 280 and the plate 292 by support blocks 298 and 299.

The female die 15 is mounted on a die mounting assembly 300, which is carried on the die actuating unit 297.

The rocking frame 272, 273 is rocked by means of a single hydraulic cylinder 301, FIG. 10A which is mounted by means of trunnions 302 between brackets 303 which are fixed to a beam 304 extending across one end face of the pit. The cylinder 301 has a ram 305 which extends upwardly and has a head 306 which carries trunnions 307 which pivot in bearings in bearing support brackets 309 which are fixed beneath the centre of the end girder 273.

The horizontal position of the rocking frame and the angle of tilt of the frame is settable by stop means. Near either end of the end girder 273 to which the ram 305 is attached there are U-shaped stirrups 310 extending below the beam. Each stirrup 310 is welded to the beam and strengthened by brackets. Within each stirrup and mounted on the beam 304 fixed to the end wall of the pit there is a stop block 311 of rectangular cross-section, and a second stop block 311 is mounted on the beam 304 below the stirrup and respectively extend upwardly and downwardly from the base to engage the blocks 311. Adjustment of the bolts ensures that the frame is returned to a horizontal position, and provides an adjustment of the setting of the angle of tilt of the rocking frame bringing the upright rollers 8 in the tilting box 17 into exact alignment with the upright rollers in the furnace to receive a hot sheet of glass for bending.

At either end of the other end girder 273 of the rocking frame there is an hydraulic shock absorber 314 having a ram which bears against the shelf 278 which extends along the sides of the pit. These shock absorbers steady the rocking frame as it nears the end of its tilting movement.

Also carries on the rocking frame there is a support structure indicated at 315, for supporting the gas burners 270.

The rollers 8, 13 and 18 in the tilting box 17 are driven by the same drive as the furnace rollers taken from the hydraulic motor 103. The upright rollers 8 and 18 are driven from their upper ends by gear boxes 317, FIGS. 9 and 10, of similar construction to the gear boxes 79 which drive the upright rollers 8 in the furnace. The gear boxes 317 are mounted above cross-girders 318 which are fixed between the cross-members 265, being adjustably mounted on the cross-girders 318 by means of V-slides in the same way as the mounting of the gear boxes 79 of the furnace.

The drive to the gear boxes 317 is by a shaft 319 coupled by a flexible coupling 320 to an intermediate shaft 321 which is coupled by a further flexible coupling 322 to an output shaft 323 of a right angle drive unit 324 which is mounted on one of the upright girders 266. The drive to the right angled drive unit 324 through a flexible coupling 325 is by a transmission shaft 326 which is held in bearings 327 on the upright girder 266 and the lower end of which is coupled by a flexible coupling 328 to a further right angled drive unit 329 which is mounted on the cross girder 280.

The lower end of each of the upright rollers 8 and 18 in the tilting box is formed as a stub shaft 330 which is supported in a self-aligning bearing block 331 fixed to a plate 332 which is mounted by brackets, one of which is shown at 333 on the ends of girders 334 which cantilever out from the centre web of the cross-girder 280. The plate 332 is adjustable laterally with respect to the brackets 333. The free end of each of the cantilever girders 334 is supported by a prop girder, not shown, which extends upwardly from a cross-girder, omitted from the drawing for clarity, spanning the two side girders 272 of the rocking frame. Supports for the floor support girders 268 beneath the floor part 260 of the tilting box are also provided from that cross girder.

A box girder 336 extending transversely of the girders 334 is mounted on the upper faces of the girders 334. The box girder 336 provides a mounting support for the bottom stub rollers 13 and their drive means.

Both the angle of inclination of the stub rollers 13 relative to the upright rollers 8 and 18 and the extent of projection of the rollers 13 between the rollers 8 and 18 is adjustable in the same manner as for the bottom stub rollers 13 in the furnace. The drive to the bottom stub rollers 13 is by means of a shaft 338 which extends parallel to the box girder 336 and is mounted in bearings carried by brackets fixed to the girder 336. The drive from the shaft 338 to the bottom stub rollers 13 is through right angle drive units 339 which are also mounted by brackets on the box girder 336. Each right angle drive unit 339 drives the corresponding stub roller 13 through an intermediate shaft 340, which through a further flexible coupling 341 drives a right angled drive unit 342 which drives a shaft 343 on which the ferrule of the roller 13 is mounted. The shaft 343 extends through a cylindrical bearing assembly 344 whose body has integral sleeves 345 which are bolted to an adjustable mounting.

The shaft 338 is driven from the bottom gear box 119 which drives the bottom stub rollers 13 at the exit end of the furnace adjacent the tilting die box 17. A conventional articulated coupling, not shown, couples an output drive shaft from the bottom gear box 119 with the end of the shaft 338 adjacent the exit end of the furnace. The other end of the shaft 338 is connected through a right angle drive unit and a flexible coupling to the input shaft of the drive unit 329 thus providing the drive to the rollers 18 through the gear boxes 317.

The female die actuator unit 297 comprises two parallel box section girders 400 which are joined near their ends by cross members which are fixed beneath the girders. The two parallel beams 296 are tied together by four cross-girders, not shown, the ends of which are welded to the beams 296. The upper surface of each of the support beams is fitted with two bed plates 405 which extend for some distance along the upper surface of both beams 296 in the region of both ends of the beams. Running on these bed plates 405 are recirculating ball bearing pads each fixed to the side of one of the girders 400 by brackets 407. The ball bearing pads support the box girders 400 and the female die actuating mechanism 300 on the main beams 296.

Mounted on a plate 422 fixed to the side of one of the support beams 296 are four limit switches S9, S10, S11 and S12. The switches are staggered at right angles to the plate 422 so as to be operated as appropriate by strikers 423 which are fixed beneath a plate 424 which is cantilevered out from the side of one of the box girders 400.

These switches and their strikers are located so as to give the following indications S9—female die partly out S10—female die in
S11—female die partly in
S12—female die out.

MALE DIE

The male die 16 is mounted on a male die support unit 291, itself mounted on an actuator unit 289 of similar construction to the support unit and actuator unit for the female die.

The male die construction is shown in more detail in FIG. 11 and comprises a continuous die face 490 of sheet steel which is perforated as indicated at 491 and is provided with a coating of refractory material for engaging one face of the hot glass sheet which is bent against that surface by the open frame of the female die construction. A shaped frame 492 provides a mounting for the die face 490 and is connected to a back frame 493 by adjustable struts of known kind indicated at 494.

An inner wall 495 is mounted on stays within the back frame 493 and the upper edge of the wall 495 is connected to the shaped frame 492 by a flexible seal 497. The back frame 493 has a back plate 498 sealed to it which plate is recessed to receive pneumatic ducts 499 which lead into a chamber formed by the die face 490, the inner wall 495 and the back plate 498, from the manifold 500 which is connected through a valve 501 to a pressure duct 502 and through a valve 503 to a vacuum line 504. The flexible seal 497 permits adjustment of the location of the male die face 490 relative to the back frame 493.

Opening of the valve 503 connects the chamber within the die to the vacuum line and is effective through the perforations 491 in the die face to help such a sheet being bent against the surface of the die.

When bending is complete, with the valve 503 shut, opening of the valve 501 provides a puff of air through the perforations 491 to help release the bent glass sheet from the surface of the male die upon opening of the dies.

A support frame 510 is fixed on the back plate 498 within the die chamber near to the bottom of the die, and carried electric heating elements indicated at 511, and also shown in FIG. 10A, which are employed to heat the lower part of the die when a temperature gradient is required from top to bottom of the surface 490 of the male die to match a temperature gradient already put into the sheet as it passes through the furnace with the alternative arrangeent of heaters 44a, 44b; 45a and 45b of FIG. 3. Electric supplies to the elements 511 are connected through the back of the die in conventional manner.

The back plate 498 of the male die is hung from the main die support using an adjustable locating and clamping arrangement, and angular rotation about a horizontal axis generally at right angles to the back plate 498 of the die is possible since the male die support unit 291 is adjustably connected to the male die actuator unit 289.

Two limit switches S13 and S14 are mounted on a plate 506, FIG. 10A, fixed to the side of one of the support beams 286 which support the male die actuator unit. The switches are actuated by strikers fixed beneath a plate 507 cantilevered from the side of one of the box girders 400 of the male die actuator unit. These switches and strikers are located so as to give the following indications S13—male die partly out
S14—male die in.

TONG BAR AND HOIST

Figure 12A:
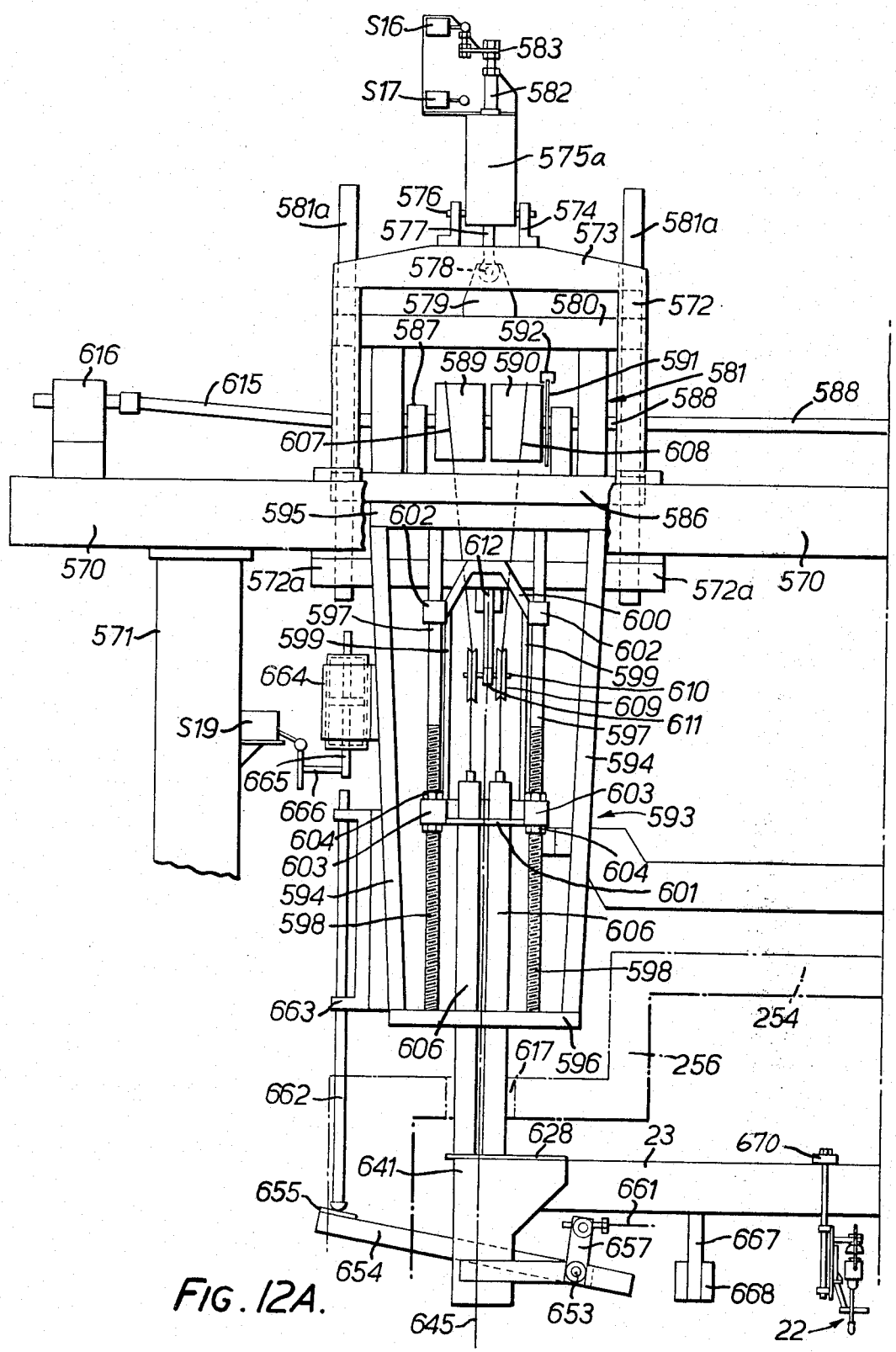
Figure 12B:
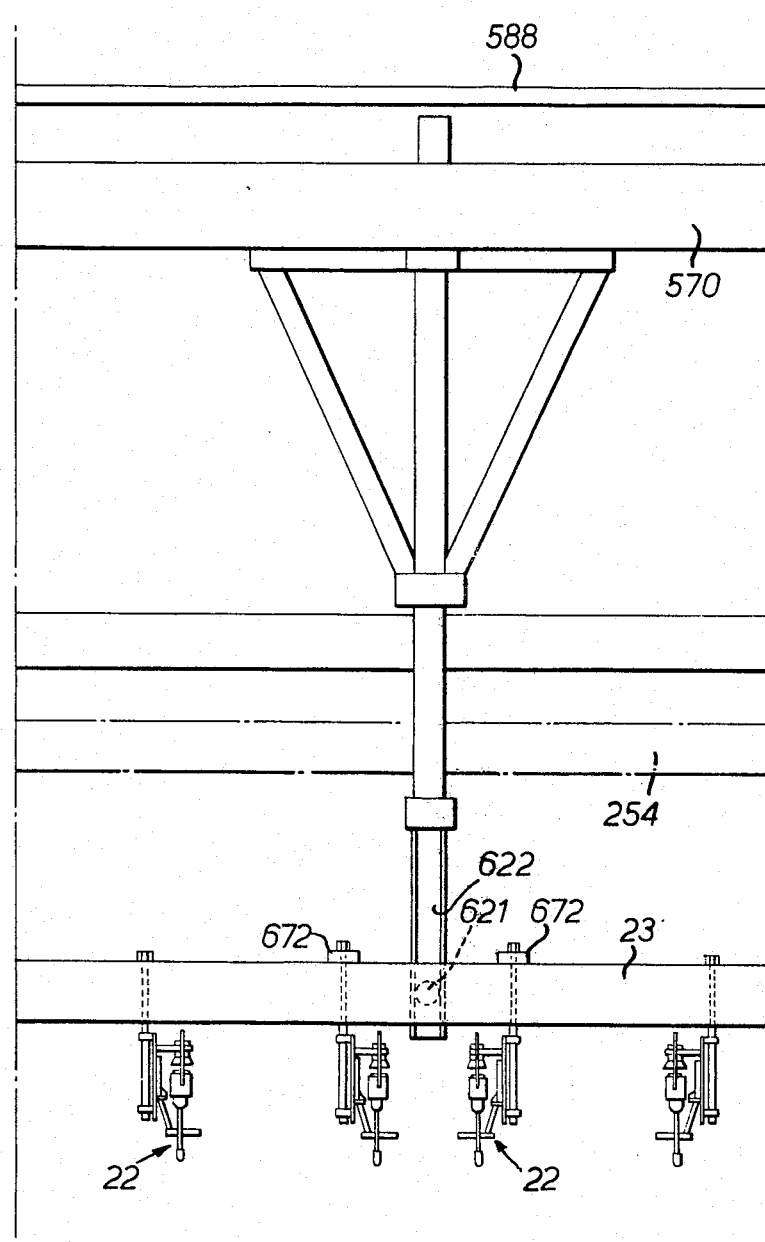
Figure 12C:
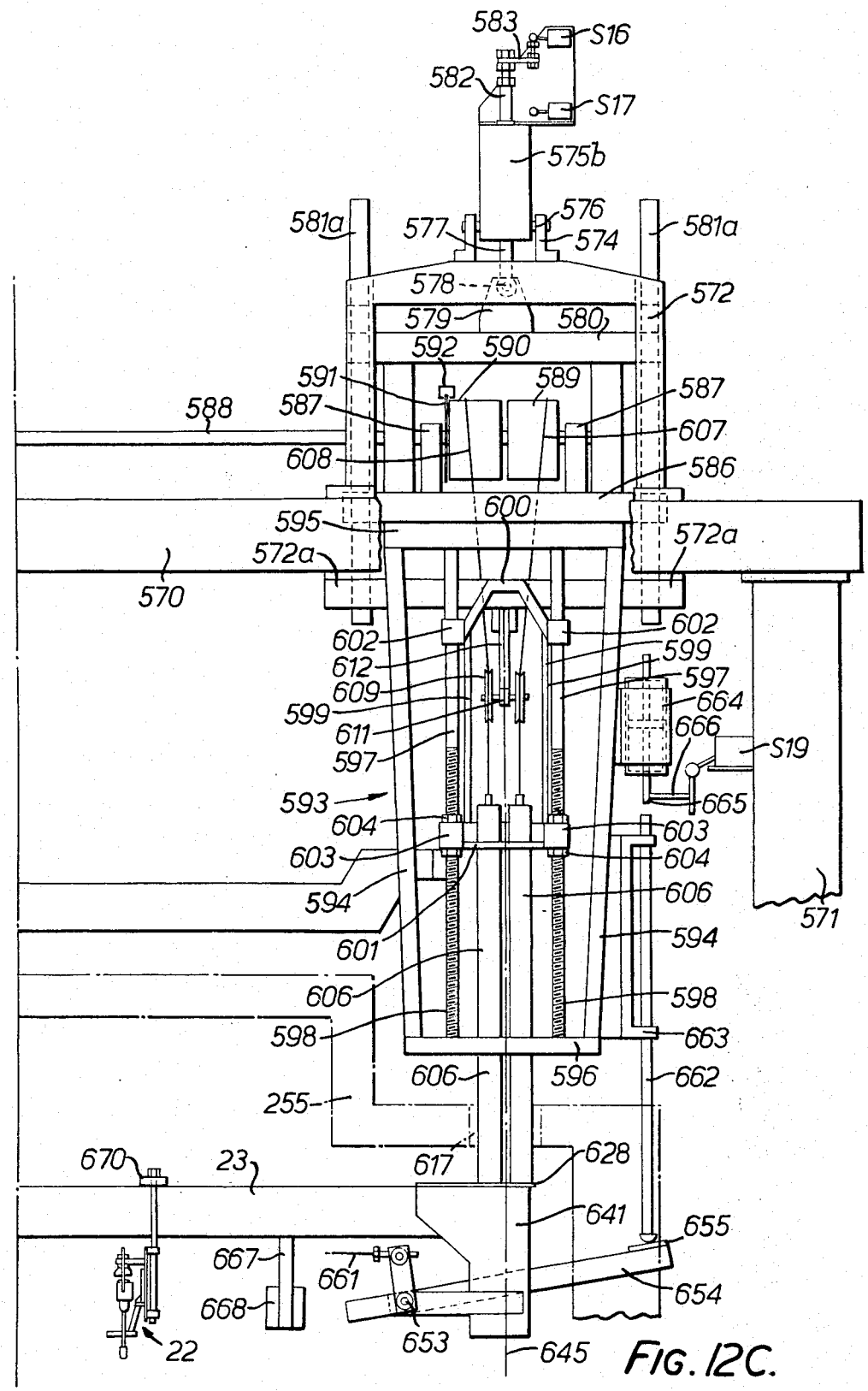
Figure 13A:
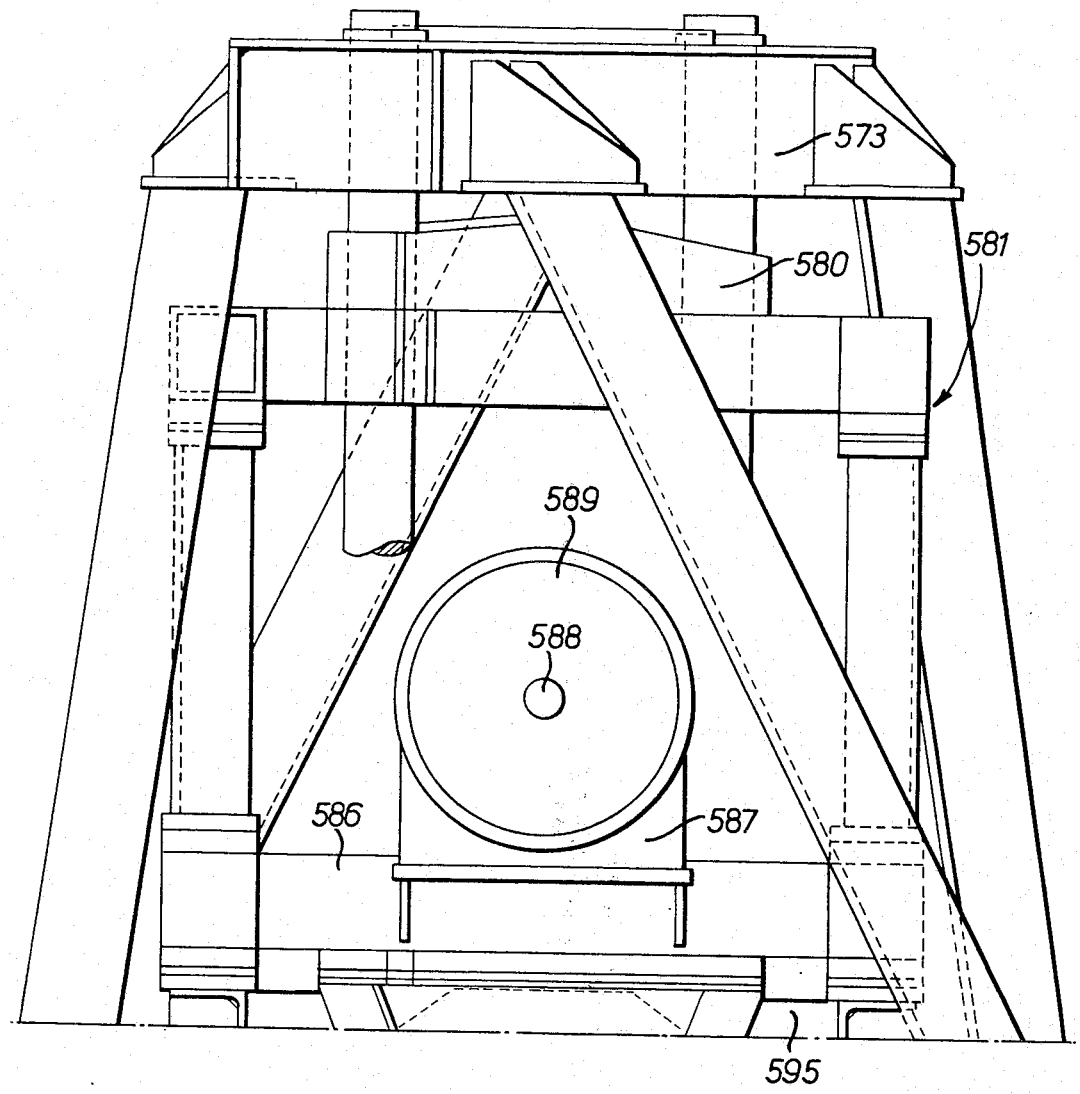

The tong bar 23 from which six tongs 22 are suspended and the hoist mechanism from which the tong bar is suspended are illustrated in more detail in FIGS. 12 and 13. Each of the tongs 22 is movable to a location exactly positioned over the upper edge of the bent glass sheet between the bending dies before the tongs close onto the upper edge of the sheet, and each of the tongs is loosely mounted in a tong gate structure which is described in detail in the above mentioned copending application Ser. No. 450,459, and which is mounted above a vertical pivot secured to or cantilevered from the tong bar.

The tong bar 23 is a straight bar which is suspended from two hoists each of which is mounted on an overhead beam structure 570 which is supported on pillars 571 which structure straddles the tilting box as shown in FIG. 12. A hoist is provided for each end of the tong bar 23 and each hoist comprises a fixed head frame 572 which is an open cuboid structure including vertical supports and cross supports and having a cross head 573 on the upper surface of which are fixed trunnion brackets 574 in which the head of an hydraulic cylinder, respectively 575a and 575b is mounted by pivots 576. The piston rod 577 of the piston which is slidably in the cylinder 575 extends downwardly through the head of the cylinder and is pivotally linked at 578 to massive lugs 579 which are fixed to a cross head member 580 of a movable frame structure 581 also of open cuboid form which is movable vertically within the fixed head structure 572 by actuation of the cylinder 575. The movable frame structure is fixed to vertical shafts 581a which slide in bearings which are in lugs 572a on the head frame 572.

The piston rod 577 extends through the upper end of the cylinder as indicated at 582 and carries on its upper end a switch actuating member 583 which co-operates with two limit switches S16 and S17 which are actuated when the piston in the cylinder 575 reaches the limits of its upward and downward movement which moves the frame 581 up and down within the fixed head frame 572.

The frame 581 includes a horizontal base structure 586 which provides a mounting for bearing brackets 587 which carry a shaft 588 on which are mounted two winding drums 589 and 590 both of which are coupled to the shaft 588 by a slipping clutch.

A brake disc 591 is also journalled to the shaft and braking caliper arms 592 are fixed to a support on the base structure 586. The calipers 592 co-operate with the disc 591 for braking the hoist drums as will be described.

Fixed below the movable frame 581 is a lower frame indicated generally at 593. The lower frame comprises four suspension girders 594 which extend downwardly from a frame 595 of the movable head 581. The lower end of each of the suspension girders 594 is fixed to a bottom plate 596. There are four girders 594 respectively to the corners of the upper frame 595 and the bottom plate 596.

Two shafts 597, the lower parts of which are threaded as indicated at 598, extend between and are fixed to the upper frame 595 ands the lower plate 596. The shafts 597 carry a centre frame which comprises two vertical members 599 which are joined at their upper ends by a bridge plate 600 and at their lower ends by a cross member 601. The centre frame is mounted on the shafts 597 by lugs 602 positioned at the ends of the bridge member 600 and which are fitted with bearing sleeves. The lugs 602 support the centre frame on the shafts 597 while permitting vertical movement of the centre frame relative to the shafts 597. Further lugs 603 are fixed to the lower ends of the side members 599 and are located on the threaded parts 598 of the rods 597 by means of nuts 604.

Adjustment of the nuts 604 adjusts the vertical position of the centre frame with respect to the frame 593 which is suspended beneath the movable frame structure 581.

The centre frame carries two guide tubes 606 which serve to guide lifting cables 607 and 608 which are respectively wound on to the hoist drums 589 and 590. Both the cables 607 and 608 pass over jockey guide pulleys 609 which are mounted on spindles 610 supported on a mounting bar 611 which is suspended by struts 612 beneath the movable frame 581. The two jockey pulleys 609 are offset with respect to each other as shown in FIG. 38. The two tubes 606 are similarly offset so that the lower ends of the tubes can respectively engage the upper face of the tong bar 23 near to the back and front edges of the upper face of the tong bar. The cables 607 are connected to the front edge of the tong bar 23 and the cables 608 are connected to the back edges of the tong bar.

Figure 13B:
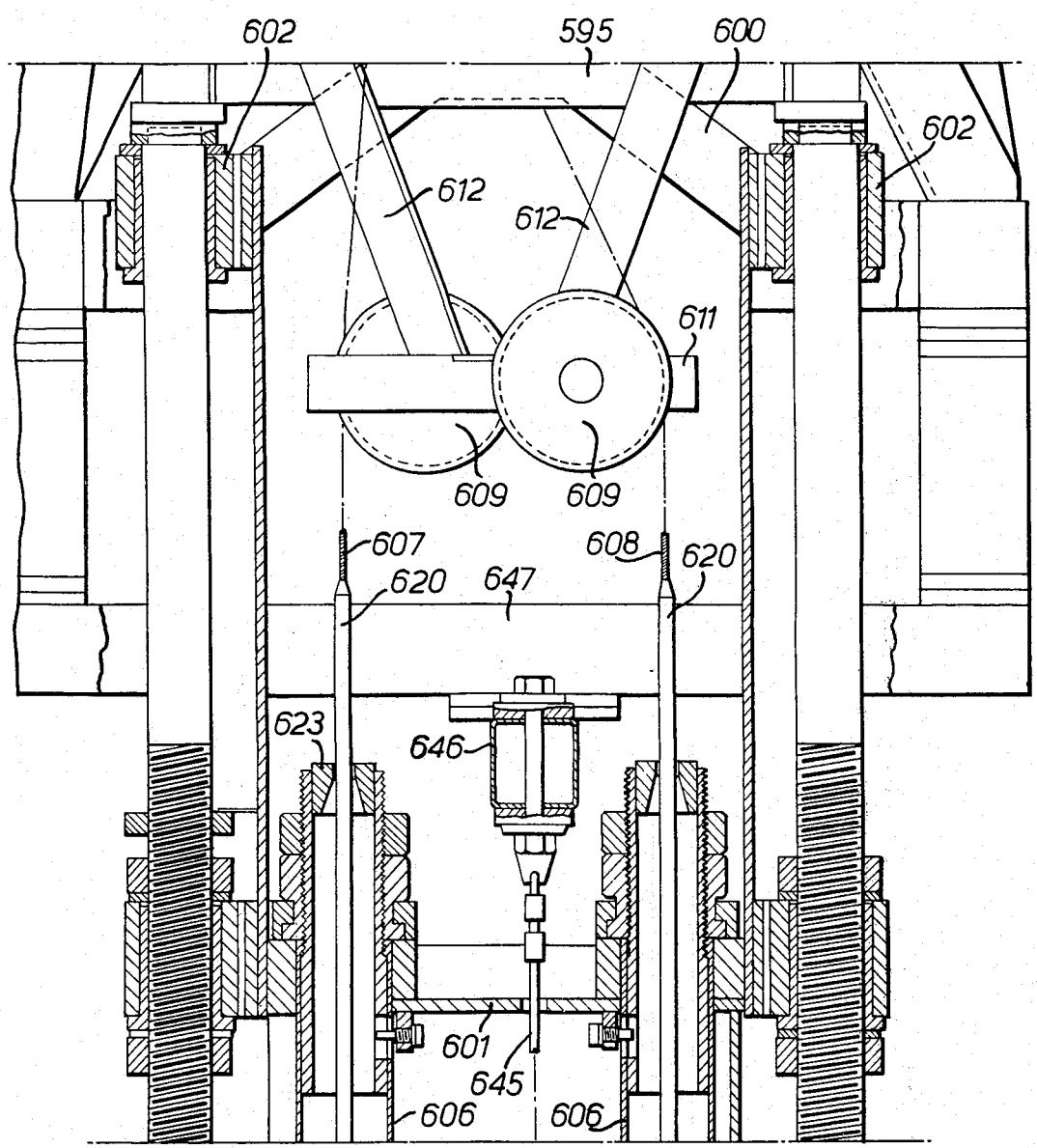

FIG. 13B shows how the upper ends of the guide tubes 606 are fixed to the cross member 601 of the centre frame. The upper ends of the guide tubes 606 pass through apertures in the cross member 601 and are fixed to the cross member 601 by captive nuts. The guide tubes 606 pass through bearing bushes, not shown, fixed in the bottom plate 596 of the movable frame, to permit vertical adjustment of the guide tubes within the movable frame 593 when the position of the lugs 603 on the rods 597 is adjusted. In this way the vertical position of the centre frame with the guide tubes 606 is adjustable to accommodate the uppermost position and the lowered position of the tong bar 23 to suit different heights of the glass sheets being processed. Appropriate adjustment of the depth of the steps 255, 256 in the roof of the tilting box to accommodate these adjustments of the hoist mechanisms is also made as described with reference to FIG. 16.

The shaft 588 of the hoist drums 589 and 590 shown in FIG. 12A is connected by a flexible drive coupling 615 to an hydraulic drive motor 616 which is mounted on the cross beam 570 of the overhead support structure. The shaft is extended right along the top of the beam 570 to the right-hand hoist unit where it is supported in further bearing bushes 587 and has fixed to it the hoist cable drums 589 and 590 for the right-hand hoist unit for the tong bar 23 which is identical in every respect to the left-hand hoist unit.

The guide tubes 606 which are made of heat resisting stainless steel extend downwardly through glands 617 in the roof 254 of the tilting box and locate the upper face of the tong bar 23 which is suspended within the tilting box by the cables 607 and 608.

In the position illustrated in the drawing the pistons are retracted in the cylinders 575 so that the movable frames 581 are in their uppermost position retracted upwardly within the fixed frames 572 and the cables 607 and 608 are wound up on the drums 589 and 590 so that the upper face of the tong bar 23 is located against the lower end of the tubes 606 which are themselves in their uppermost position.

The lower parts of the lifting cables 607 and 608 are fitted with sleeves 620 which are located in bushings fitted in the upper and lower ends of the guide tubes 606. The tong bar 23 is fixed to the lower ends of the sleeves 620 and in the upwardly retracted position as illustrated the upper ends of the sleeves 620 project upwardly out of the upper ends of the guide tubes 606.

The location of the tong bar 23 in its raised position as illustrated is assisted by a roller 621 mounted on the back face of the tong bar 23 which roller engages in a guideway 622 which depends through the roof of the tilting box from the overhead beam 570.

In the upwardly retracted position of the tong bar which is illustrated the jaws of the tongs 22 are spaced above the position of the upper edge of the bending dies. The lowering of the tong bar to bring the tong jaws astride the upper edge of a bent glass sheet when it is held between the bending dies is effected by simultaneous actuation of the two cylinders 575 to push the movable frames 581 and 593 downwardly with the tong bar still tightened against the lower ends of the guide tubes 606 by the hoist cables 607 and 608. The whole of the movable hoist arrangement moves downwardly to reposition the tong bar 23 at a location where the open jaws of the tongs straddle the upper edge of the bent glass sheet held between the bending dies. The tongs are so located on the tong bar that they are lowered into the spaces between the sections of the ring frame female die, FIG. 9, and into corresponding recesses cut into the upper edge of the male bending die to accommodate the jaws of the tongs. As the tong bar is lowered the tongs are guided into exact location above the upper edges of the glass sheet.

Figure 13C:
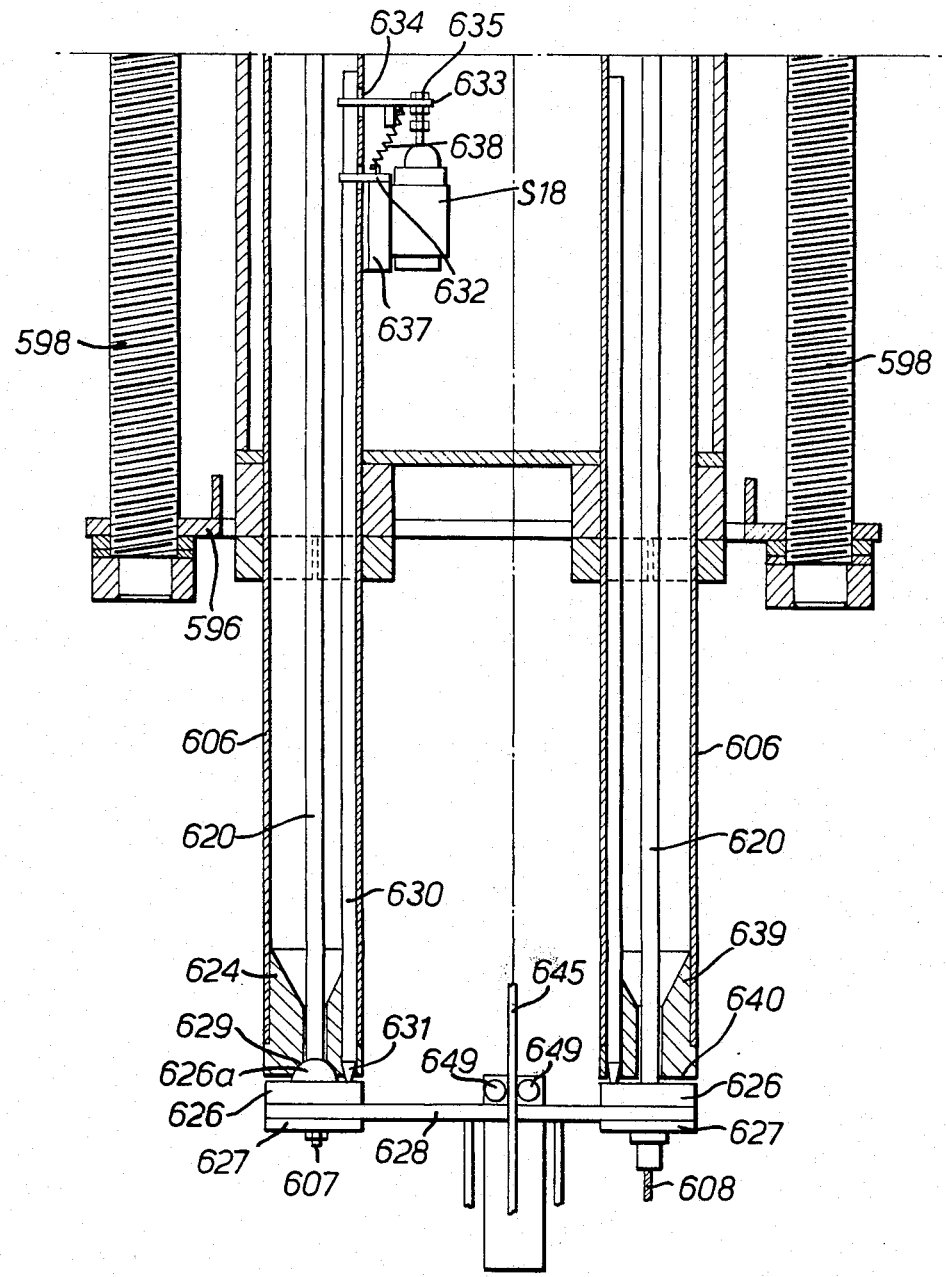

The guide tubes 606 through which the cables 607 and 608 pass are shown in detail in FIGS. 13B and 13C. The sleeve 620 which is fitted on the end of the cable 607 passes through a bush 623 welded into the top of the guide tube 606 and through a specially shaped bush 624 which is fitted into the bottom end of the guide tube.

The lower end of the cable sleeve 620 is welded to an upper adaptor plate 626 which rests on the upper face of a plate 628 of the tong bar and has a hemi-cylindrical boss 626a on its upper surface. The end of the cable 607 which projects from the lower end of the cable sleeve 620 passes through the plate 628 and through a lower adaptor plate 627 below the plate 628. A ferrule is welded to the lower end of the cable beneath the adaptor plate.

The lower face of the bushing 624 is formed with a surface 629 of inverted V-section which receives the hemicylindrical boss 626a of the upper adaptor plate 626 when the cable 607 is taut clamping the tong bar plate 628 against the bottom of the guide tubes.

A push rod 630 is housed in the guide tube 606, and extends through a vertical hole drilled in the bush 624. The lower pointed end 631 of the push rod rests on the upper face of the adaptor plate 626 when the tong bar is drawn against the guide tubes. The upper end of the push rod 630 is guided by a lug 632 inside the guide tube 606 and fixed to the rod 630 near its upper end is a radially extending striker arm 633 which passes through a slot 634 cut into the wall of the guide tube.

An adjustable screw 635 on the arm 633 engages with a pressure-operated switch S18 which is mounted by a bracket 637 on the outside of the guide tube 606. when the tong bar is in its raised position as indicated in the drawings the rod 630 is pushed upwardly so that the screw 635 disengages from the switch S18. When the tong bar is lowered relative to the guide tube 606 the lower support for the pointed end 631 of the pin 630 falls away, the pin is pulled down by action of a spring 638 which connects the striker arm 633 to the bracket 637, and the switch S18 is operated to indicate that the tong bar is being lowered as the cables 607 and 608 unwind.

The other guide tube 606 through which the cable 608 is threaded has differently shaped bushing 639 fixed in the lower end of the guide tube 606 and extending below the tube end without a conically formed internal face, thereby providing a lower flat abutment face 640 against which the flat upper face of the adaptor plate 626 abuts when the tong bar plate 628 is drawn upwardly against the lower end of the guide tubes. The adaptor plate 627 for fixing the lower end of the cable 608 to the front edge of the tong bar plate 628 includes a cable clamp clamped to the end of the cable 608 beneath the tong bar. The clamp can be adjusted on the cable to permit adjustment of the angle of tilt of the tong bar by pivoting about the hemicylindrical boss 626 of the adaptor plate 626. This permits exact adjustment of the tong bar when the hoist mechanism is being set up.

The tong bar is steadied and guided during an upward and downward movement by means of two guide wires 645. The upper end of each of the guide wires 645 is held in a clamp 646, FIG. 13B, attached to a lower member 647 of the fixed head frame. The guide wires 645 extend vertically right through the tilting box and down the sides of the pit beneath the tilting box. At the bottom of the pit the lower end of each guide wire 645 which passes beneath the guide pulley, not shown, terminates in a shackle which is attached to the shaft of a hydraulic cylinder by means of which the wire 645 is maintained at a required tension.

Attached to each of the top plates 628 at the ends of the tong bar, there is a pair of rollers 649 extending parallel to the tong bar. The guide wires 645 passes between these rollers 649. Similar pairs of rollers 650 running on the guide wires are mounted on a cross plate 651 which is welded between the bottom ends of the two side plates 641 of the bracket.

At both ends of the tong bar there are welded to the side plates 641 near their lower end side extension plates 652 which extend inwardly of the tong bar and carry a pivot pin 653 on which is pivoted a frame comprising two side arms 654 which are pivoted on the ends of the pin 653 which project through the outside faces of the ends of the extension plates 652. One of the side arms 654 has a rearward extension which is fitted with a striker plate 655 to be engaged by a pusher rod for rocking the frame. The arms 654 are connected together at their outer ends by bolts 656 and fixed to each of the arms and extending at right angles thereto in the region of the pivot pin 653 are upstanding plates 657 the upper ends of which are connected by a rod 659 in which there engage screw clamps 660 in which there are clamped the ends of three actuator cables 661 which open and close three of the tongs. Three of the tongs are actuated from each end of the tong bar.

Each of the tongs is preferably constructed so that the tong jaws close under the weight of sliding weights forming a part of the tong construction.

Each of the striker plates 655 is engaged by a pusher rod 662, which, as shown in FIG. 12 is slidable in a bracket 663 fixed to one of the vertical members 594 positioned beneath a pnumatic cylinder 664 which is also fixed to the member 594 and whose downwardly extending ram 665 can, when extended, press the pusher rod 662 downwardly to engage the striker plate 655 and cause the arms 654 to rotate thereby tensioning the cables 661 and opening the tong jaws.

A striker plate 666 engages a limit switch S19 when the ram 665 is withdrawn into the cylinder and the tong jaws are closed. Identical pusher rod arrangements are provided associated with the two ends of the tong bar, each having a pneumatic cylinder 664 and limit switch S19.

Also mounted on the tong bar 23 near each end are downwardly dependent bracket arms 667 carrying square metal plates 668 which are employed for sensing photoelectrically the location of the tong bar during its downward travel below the tilting box.

TONG AND TONG SUSPENSION

Six pairs of tongs 22 are suspended from the tong bar 23 and the suspension for the tongs is such that when a bent glass sheet is held between the dies, the tong bar descends with the tongs positioned with their jaws open to straddle accurately the upper edge of the bent glass sheet.

Each of the outermost tongs 22 is suspended in a tong gate which is pivoted on an arm 670 mounted at right angles to the tong bar which cantilevers the pivot out from the tong bar 23 towards the male die. The next innermost pair of tongs 22 are suspended in tong gates whose pivots are directly connected to the tong bar. The innermost tongs 22 are suspended in gates which are pivoted on the ends of the cantilever arms 672 which are cantilevered at right angles to the tong bar 23 backwardly towards the female die.

Means are provided for guiding the tongs into exact location with the tong jaws straddling the upper edge of the glass sheet as the tong bar 23 is lowered. When the lower position of the tong bar 23 is reached, that is the lower position of the pistons in the cylinders 576, the cables 661 are relaxed and the jaws close onto the glass sheet.

The male and female bending dies, which are at the temperature of their environment within the tilting box which is maintained as nearly as possible the same as that of the glass sheet leaving the furnace, remain closed on the sheet for the period of, for example, 5 seconds during which period bending stresses which are induced in the glass by the bending operation are permitted to relax and inhomogeneities within the glass are reduced due to the contact of the glass with the hot bending dies. When the tongs grip the upper edge of the glass sheet the lifting fingers are lowered, and retracting of the female die begins and the bent glass sheet, suspended from the tongs, is still in contact with the continuous surface of the male die.

The valve 501, FIG. 31, is opened and air puffed through the perforations 491 in the male die releases the bent sheet from the male die surface and retraction of the male die begins.

The bent glass sheet is now freely suspended vertically from the tongs and the lowering of the glass sheet for further processing commences. The rocking of the box back to its tilted position begins ready for receiving the next sheet to be bent, and the retraction of male and female dies to their initial positions is completed.

BOOST HEATING

The temperature to which the glass sheet heated during its advance through the furnace which temperature is related to the time of heating of the glass in the furnace so as to heat the glass without unacceptable deformation as it relaxes against the upright rollers of the furnace, is also the temperature at which the glass is bent and this temperature in the range 580° to 650°, e.g. 610°C is the temperature of the bent sheet of glass released from the bending dies and suspended by the tongs within the tilting box.

It is often desirable, particularly when producing a high strength glass sheet, that the initial temperature of a glass sheet before toughening should be greater than the bending temperature, e.g. 680°C and prior to the quenching of the sheet in the tank 26 of quenching liquid, the sheet, as it is lowered, passes between boost heaters which heat the sheet to a higher initial temperature from which it undergoes a preliminary surface cooling prior to immersion in the chilling liquid.

After bending of the glass, the rams 577 in the cylinders 575 of the hoists are extended downwardly so that the movable frames 593 are at their lowermost position relative to the fixed head frames. Further lowering of the tong bar during continued processing of the glass takes place by operation of the hoist motor 616 which, through the flexible drive 615, drives the shaft 588 and the cable drums 589 and 590 to unwind the cables 607 and 608 which suspend both ends of the tong bar. Vertical descent of the tong bar along the guide wires 645 commences and the glass passes between the two banks of boost heaters 27, FIG. 1, which are shown in more detail in FIG. 14. The top of the boost heaters 27 is about 60 cm below the bottom edges of the dies, and the boost heater panels are 100 cm deep.

The banks of boost heaters each comprises a refractory panel 790 which carries a pattern of heating elements 27. The refractory panels 790 form walls of an elongated chamber having an open entrance mouth 791 lying belowing the exit mouth 269 from the tilting box. Sealing asbestos curtains 792 hang downwardly from the sides of the elongated mouth 269 against members defining the mouth 791 into the refractory boost heating assembly. The refractory panels are fixed vertically and the flexible asbestos curtains 792 provide a flexible seal between the mouth 269 of the tilting box and the fixed entrance mouth 791.

Each of the refractory panels has a metal support backing structure 793. The heater elements 27 are in the form of wire wound elements on ceramic tubes which are mounted on steel connector rods 794 which are fixed through the refractory panels 790 and are mounted in insulators held by the metal backing structure 793.

The electrical supplies to the boost heater elements 27 are such as to maintain the heater elements at a temperature in the range 750° to 1600°C, for example 1000° to 1200°C. During the downward passage of the bent glass sheet between the heaters the glass may be heated to 60°C or more above the temperature at which it leaves the bending dies, for example the glass at 620°C may be heated to a pre-quenching temperature of 680°C.

If the glass passes downwardly at uniform speed between the heater elements it is heated substantially uniformly throughout its thickness. The surface temperature may be raised slightly higher than that of the core of the glass but at worst a temperature difference of about 12°C is produced between the surfaces and the core of the glass.

Alternatively, and in order to heat the lower edge of the glass sheet to a higher temperature than the upper edge of the glass sheet, the glass may be accelerated when the lower edge of the glass sheet is at the level of the bottom of the heater panels for example, from a lowering hoist speed of 150 mm/sec. to a lowering speed of 300 mm/sec. The heating time for the upper part of the glass sheet between the boost heater panels is therefore less and so, while each part of the glass sheet is heated so that there is substantially no temperature gradient through its thickness or at most about 12°C as just described, a linear temperature gradient is set up from a high temperature of for example, 700°C at the lower edge of the bent glass sheet to a lower temperature of for example, 680°C at the upper edge of the glass sheet as it passes between the bottom of the boost heaters 27 to a pre-cooling stage prior to quenching in the oil tank 26.

The control equipment to be described permits the setting up of a selected velocity profile for the hoist motor 616 from initiation of its operation to the time the hot bent sheet of glass is brought to rest in the quench tank.

A maximum lowering speed of 100 cm/sec. can be achieved, and some further examples will be given. Some more detailed examples of operation will now be given in Table IX which given the temperature at which the glass is bent as well as times between the boost heaters to heat the glass to a desired prequenching temperature and values of hoist speed necessary to achieve the desired temperature.

TABLE IX

| Thickness mm | Temp. °C | Furnace Temp. °C | Temp. °C | in Boost Heat (seconds) | Speed in/sec. |
|---|---|---|---|---|---|
| 2.0 | 580 | 750 | 650 | 22 | 1.6 |
| 2.0 | 620 | 750 | 680 | 25 | 1.4 |
| 2.0 | 580 | 1000 | 630 | 4.0 | 9.0 |
| 2.0 | 580 | 1000 | 720 | 12.6 | 2.8 |
| 2.0 | 620 | 1000 | 720 | 9.3 | 3.9 |
| 2.0 | 620 | 1600 | 720 | 2.1 | 17.0 |
| 3.0 | 580 | 750 | 630 | 20 | 1.8 |
| 3.0 | 580 | 750 | 650 | 30 | 1.2 |
| 3.0 | 620 | 750 | 630 | 5 | 7.2 |
| 3.0 | 620 | 750 | 680 | 35 | 1.0 |
| 3.0 | 580 | 1000 | 630 | 5.6 | 6.4 |
| 3.0 | 580 | 1000 | 720 | 17.3 | 2.1 |
| 3.0 | 620 | 1000 | 720 | 12.9 | 2.8 |
| 3.0 | 580 | 1600 | 630 | 1.3 | 28.0 |
| 3.0 | 580 | 1600 | 720 | 3.9 | 9.0 |
| 3.0 | 620 | 1600 | 720 | 2.9 | 12.4 |
| 4.0 | 580 | 750 | 630 | 26.3 | 1.4 |
| 4.0 | 620 | 750 | 630 | 6.3 | 5.7 |
| 4.0 | 650 | 750 | 670 | 16 | 2.3 |
| 4.0 | 580 | 1000 | 630 | 7.2 | 5.0 |
| 4.0 | 580 | 1000 | 720 | 22.2 | 1.6 |
| 4.0 | 620 | 1000 | 630 | 1.4 | 25.7 |
| 4.0 | 620 | 1000 | 720 | 16.6 | 2.2 |
| 4.0 | 650 | 1000 | 680 | 5.0 | 7.2 |
| 4.0 | 650 | 1000 | 720 | 12.0 | 3.0 |
| 4.0 | 580 | 1600 | 630 | 1.7 | 21.2 |
| 4.0 | 580 | 1600 | 720 | 7.9 | 7.4 |
| 4.0 | 620 | 1600 | 720 | 3.62 | 9.9 |
| 4.0 | 650 | 1600 | 720 | 2.6 | 14.0 |

Some further examples of operation are given in Tables X, XI and XII which show the production of a linear temperature gradient of from 10° to 30°C from a higher temperature of the lower edge of the sheet to a lower temperature of the upper edge of the sheet. These tables are based on a glass sheet 25 cm in height, the acceleration of which takes place from the initial speed to the final speed when the lower edge of the glass sheet has reached the bottom of the furnace. The hoist speed gives the approximate transit times of the top and bottom edges of the glass sheet between the boost heaters.

PRE COOLING STAGE

The two blowing boxes 28 are each elongated boxes which extend from side to side of the pit below the booster heaters. Each of the boxes 28 with its nozzles 29 extending from the front face of the box is mounted on side wheels 800, FIG. 15, which run on tracks 801 which extend longitudinally along the side walls of the pit. Each of the blowing boxes 28 is connected by a duct 802 to a centrifugal blower 803 mounted near one of the end walls of the pit and each of the blowing boxes 28 has an individual supply from its own centrifu-

TABLE X

Glass Thickness 2.0 mm

| Bending Temp. °C | Boost Heat Furnace Temp. °C | Final Glass Temperature °C Bottom Edge | Top Edge | Gradient °C | Time in Boost Heat Seconds Bottom Edge | Top Edge | Hoist Speed in/sec. Initial | Final |
|---|---|---|---|---|---|---|---|---|
| 580 | 750  | 630 | 620 | 10 | 15   | 11  | 2.4  | 4.0  |
| 580 | 750  | 650 | 620 | 30 | 22   | 11  | 1.6  | 6.5  |
| 580 | 1000 | 630 | 620 | 10 | 4.0  | 3.2 | 9.0  | 13.0 |
| 580 | 1000 | 720 | 690 | 30 | 12.6 | 9.4 | 2.9  | 4.6  |
| 580 | 1600 | 720 | 690 | 30 | 2.8  | 2.2 | 13   | 19   |
| 620 | 750  | 680 | 650 | 30 | 25   | 11  | 1.44 | 9    |
| 620 | 1000 | 720 | 710 | 10 | 9.3  | 8.3 | 3.9  | 4.6  |
| 620 | 1000 | 720 | 690 | 30 | 9.3  | 6.3 | 3.9  | 7.5  |
| 620 | 1600 | 720 | 710 | 10 | 2.1  | 1.8 | 17   | 22   |

TABLE XI

Glass Thickness 3.0 mm

| Bending Temp. °C | Boost Heat Furnace Temp. °C | Final Glass Temperature °C Bottom Edge | Top Edge | Gradient °C | Time in Boost Heat Seconds Bottom Edge | Top Edge | Hoist Speed in/sec. Initial | Final |
|---|---|---|---|---|---|---|---|---|
| 580 | 750  | 630 | 620 | 10 | 20   | 15   | 1.8  | 2.9  |
| 580 | 1000 | 630 | 620 | 10 | 5.6  | 4.5  | 6.4  | 9.0  |
| 580 | 1000 | 720 | 690 | 30 | 17.3 | 13.1 | 2.1  | 3.3  |
| 580 | 1600 | 680 | 670 | 10 | 2.7  | 2.5  | 13.3 | 15.0 |
| 580 | 1600 | 720 | 690 | 30 | 3.9  | 3.0  | 9.2  | 14.0 |
| 620 | 750  | 540 | 630 | 10 | 10   | 5.0  | 3.6  | 14.4 |
| 620 | 750  | 680 | 650 | 30 | 35   | 15   | 1.0  | 7.2  |
| 620 | 1000 | 660 | 650 | 10 | 5    | 3.6  | 7.2  | 12.4 |
| 620 | 1000 | 720 | 690 | 30 | 12.9 | 8.7  | 2.8  | 5.5  |
| 620 | 1600 | 680 | 670 | 10 | 1.7  | 1.4  | 21.2 | 29.0 |
| 620 | 1600 | 720 | 690 | 30 | 2.9  | 2.0  | 12.4 | 23.2 |

TABLE XII

Glass Thickness 4.0 mm

| Bending Temp. °C | Boost Heat Furnace Temp. °C | Final Glass Temperature °C Bottom Edge | Top Edge | Gradient °C | Time in Boost Heat Seconds Bottom Edge | Top Edge | Hoist Speed in /Sec. Initial | Final |
|---|---|---|---|---|---|---|---|---|
| 580 | 750  | 630 | 620 | 10 | 26.3 | 20   | 1.4  | 2.1  |
| 580 | 750  | 650 | 620 | 30 | 40   | 20   | 0.9  | 3.6  |
| 580 | 1000 | 630 | 620 | 10 | 7.2  | 5.7  | 5.0  | 7.3  |
| 580 | 1000 | 720 | 690 | 30 | 22.2 | 16.9 | 1.6  | 2.5  |
| 580 | 1600 | 660 | 650 | 10 | 2.8  | 2.4  | 12.8 | 16.4 |
| 580 | 1600 | 720 | 690 | 30 | 4.9  | 3.9  | 7.4  | 10.4 |
| 620 | 750  | 640 | 630 | 10 | 12.5 | 6.3  | 2.9  | 11.2 |
| 620 | 750  | 680 | 650 | 30 | 45   | 20   | 0.8  | 4.8  |
| 620 | 1000 | 660 | 650 | 10 | 6.2  | 4.6  | 5.8  | 9.0  |
| 620 | 1000 | 720 | 690 | 30 | 16.6 | 11.2 | 2.24 | 4.2  |
| 620 | 1600 | 720 | 690 | 30 | 3.62 | 2.5  | 10.0 | 19.0 |
| 650 | 750  | 670 | 660 | 10 | 16   | 7.5  | 2.25 | 11.1 |
| 650 | 1000 | 720 | 690 | 30 | 12   | 6.8  | 3.0  | 8.6  | gal blow 803 at a pressure of 38 cm water gauge. The wheels 800 are the wheels of carriages on which the blowing boxes and their connection ducts are mounted and the blowing boxes can be moved in and out on the tracks 801 to adjust the spacing of the ends of the nozzles 29 from the path taken by the hot bent glass sheet as it is lowered through the bottom of the boost heater elements. A usual separation of the ends of the nozzles is 10.5 cm. The front faces of the blowing boxes 28 may be flat as shown in the drawing or may be curved to a shape more nearly matching that of the bent glass sheets which are to be pre-cooled by cooling air directed from the blowing boxes.

The faces of the boxes are in one embodiment 22 cm. The nozzles orifices are 3 mm in direction and there are arranged in a "Domino 5" pattern with a pitch of 18 mm. The nozzles are staggered so that they do not face each other across the interspace through which the glass is lowered.

Attached to the carriage for the right hand blowing box 28 as shown in FIG. 15 is a downwardly depending frame 806 which carries at its lower end support shoes 807 onto which the hot glass sheet is lowered. The shoes 807 extend right across the lowering path of the glass and are steadied by stays 808 which are clamped to the track 801 when the blowing box is in desired location. The frame 806 and the stays 808 are sufficiently long to ensure that when the bottom edge of the glass rests in the shoes 807 the upper edge of the glass is just below the bottom nozzles of the blowing boxes.

The supply of cooling air to the boxes 28 is regulated so that the surfaces of the reheated glass are cooled by, for example 50°C while the core of the glass thickness does not cool appreciably below the pre-quenching temperature achieved by reheating by the boost heaters. In this way temperature gradients of about 50°C exists from the core to the surfaces of the glass as the glass leaves the ambience of the cooling air supplied through the nozzles 29 and the glass is then immediately quenched in the quench tank 26.

QUENCH TANK

The quenching tank 26 is illustrated diagrammatically in FIG. 15 and contains a body of chilling liquid maintained for example at 240°C. The tank 26 is seated on a table which stands on the lifting platform 30 which is the upper platform of the scissors-lift table 30. The table is operated hydraulically and lifts the quenching tank 26 at a time relative to the operation of the bending dies which ensures that the quench tank has been raised to a position just below the blowing boxes 28 before the glass sheet descends through the blowing boxes into the chilling liquid in the quench tank. Provision is made for the frame 806 with the shoes 807 to be fully immersed in the quenching liquid before the glass enters the tank.

The exact location of the surface of the liquid in which the glass is quenched, relative to the bottom nozzles of the blowing boxes 28 is of importance in order to ensure a minimum decay of the centre-to-surface temperature gradients produced through the thickness of the glass by the pre-cooling stage, before the glass surfaces become severely quenched by contact with the chilling liquid. It is the temperature gradients existing through the glass thickness as the core of the glass cools through the strain point of the glass which influences generation of desired surface compressive stress and central tensile stress in the glass by the time the glass has cooled to room temperature.

Accurate definition of the exact location of the surface of the chilling liquid, for example 2.5 cm below the bottom of the blowing boxes 28, is provided by causing chilling liquid to flow continuously over a weir, not shown, in the upper part of the quench tank 26.

At the appropriate time in the operation of the apparatus the platform 30 is lifted to carry the quench tank 26 to its raised quench position ready to receive a hot glass sheet. The quench tank remains in position with the hot glass resting in the shoes 807 for a time, for example 20 seconds, to ensure that the whole of the glass has cooled to a temperature well below its strain point before the platform 30 is lowered which thereby lowers the quench tank from around the supported bent glass sheet which is indicated at 856 in FIG. 15 and remains seated on the shoes 807.

During quenching, as soon as the whole of the glass is immersed in the chilling liquid and the lower edge of the glass 856 is seated on the shoes 807 the tongs are opened by actuating means in the pit engaging the striker plate 655, FIG. 12, thereby tensioning the tong operating cables, and the tong bar 23 with the tongs 22 is then raised by operation of the hoist mechanism so that the tong bar is in position above the dies before the dies are closed onto the next glass sheet to be bent.

After the quench tank has been lowered the bent glass is removed manually to a degreasing tank and after degreasing the glass is cooled to room temperature.

When a series of bent annealed sheets of glass are to be produced the quench tank 26 remains in its lowered position, the boost heating section is switched off and the air supply to the pre-cooling section is turned off.

The frame 806 is mounted in an annealing enclosure which is moved horizontally into position to receive each sheet in turn as it is lowered through the inoperative boost heating and pre-cooling sections. The frame is spring loaded to accommodate the highest speeed of the glass which will not have been damped by immersion of the glass in a chilling liquid. The shoes 807 of the frame are provided with greater thermal insulation.

Each sheet in turn rests on the shoes 807 in the annealing conditions within the enclosure so that when the glass is cool only relatively small stresses are present, as represented for example by a central tensile stress of 70 MN/m$^2$. When the sheet has cooled the annealing enclosures is moved away horizontally, the annealed sheet is removed from the frame, and the annealing enclosures is returned into position around the frame ready to receive the next sheet.

In some circumstances an annealed sheet is manufactured in succession to a toughened sheet, for example when those two sheets are to be laminated together to produce a laminated windscreen. The boost heating section and the pre-cooling section remain operative. Up to the time at which the bending dies open both sheets have identical thermal histories and the bent shapes of the sheets match for lamination. These matching bent shapes must be preserved during subsequent processing. The way in which this is achieved is described in the above-mentioned co-pending application Ser. No. 450,459.

The overall deformation index of the toughened and annealed sheet is similarly matched when they are processed so as to have a top to bottom temperature gradient, by considering the condition reached by the top edge of the glass sheet. This ensures physical matching of the top edges of the sheets which is the most critical region in the lamination process.

TILTING BOX HYDRAULIC CONTROL CIRCUITS

Figure 16:
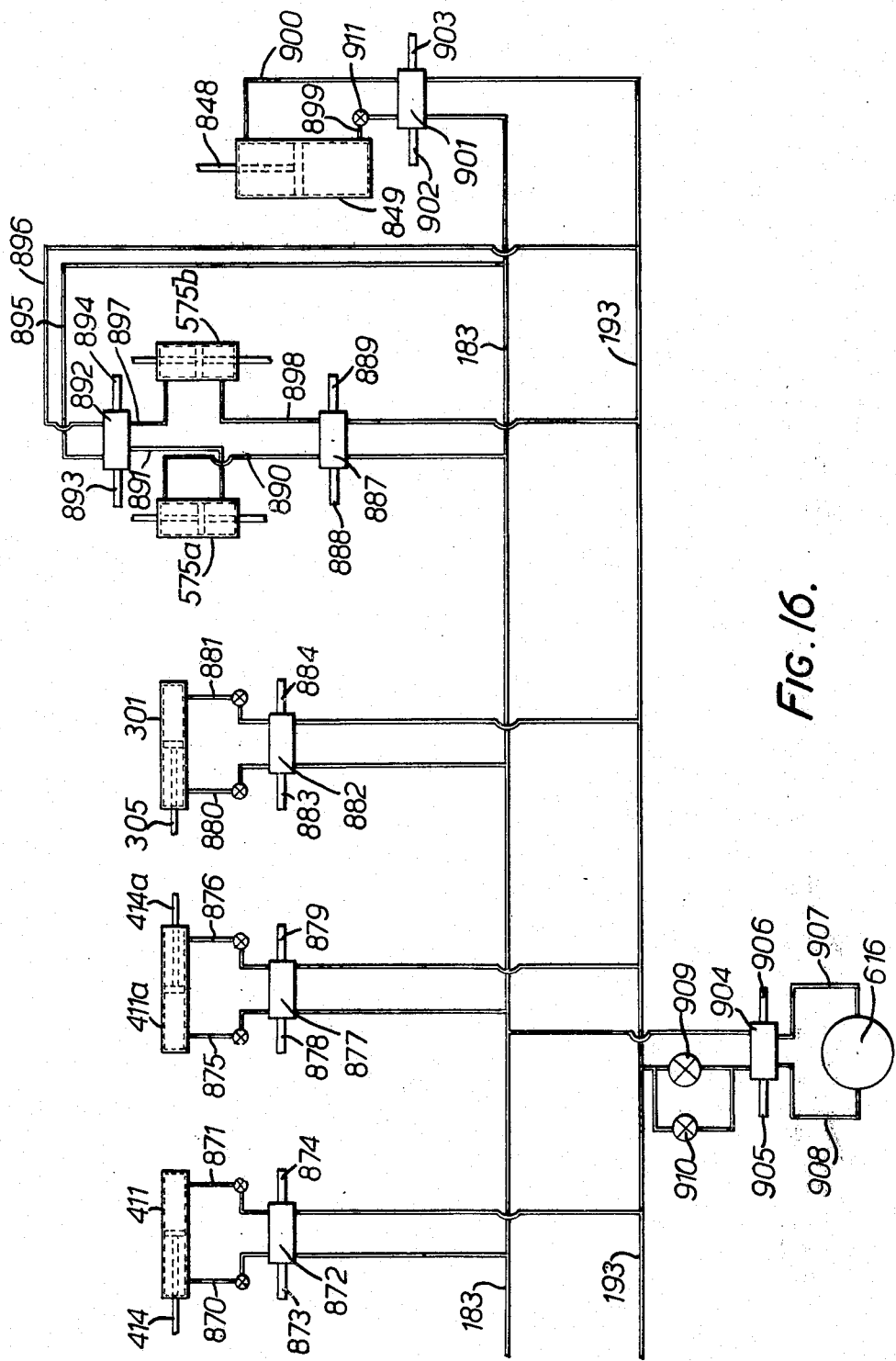
FIG. 16 is a diagrammatic hydraulic control circuit for the tilting box, the bending dies and the tong bar suspension system.

FIG. 16 illustrates diagrammatically the hydraulic circuits for operation of the female and male die actuating cylinders 411 and 411a, the rocking frame actuating cylinder 301, the cylinders 575a and 575b for raising and lowering the movable frames which carry the tong bar suspension system, and the cylinder 849 operating the scissors-lift table. The control of the motor 616 which operates the hoists from which the ends of the tong bar are suspended, is also shown.

A main supply line 183 of hydraulic fluid under pressure, provides the supply of hydraulic fluid for these cylinders. The ends of the female die actuating cylinder 411 are connected by lines 870 and 871 to a solenoid operated spool valve 872 which is also of the "locked centre" type and has operating solenoids 873 and 874. When both the solenoids 873 and 874 are deenergised, the spool of the valve is locked in a central position blocking fluid flow and maintaining the cylinder under whatever conditions currently prevail in the cylinder. Inlets to the valve 872 are connected to the pressure line 183 and the return line 193.

The ends of the male die operating cylinder 411a are connected by lines 875 and 876 to a "locked centre" directional spool valve 877 having operating solenoids 878 and 879. The inlets to the valve 877 are connected to both the pressure line 183 and the return line 193.

The ends of the rocking frame cylinder 301 are connected by lines 880 and 881 to outlets from another "locked centre" directional spool valve 882 which has operating solenoids 883 and 884 and which is connected to both the pressure line 183 and the return line 193.

A further "locked centre" directional spool valve 887, having operating solenoids 888 and 889, an input line connected to the pressure line 183 and an exhaust line connected to the return line 193, has a line 890 connected to the upper end of the left-hand vertical cylinder of the hoist mechanism of FIG. 12A, designated 575a in FIG. 16. The lower end of the cylinder 585a is connected by a line 891 to a compensating spool valve 892 having operating solenoids 893 and 894 and a pressure line 895 connected to the pressure line 183 and an exhaust line 896 connected to the return line 193.

The upper end of the right-hand cylinder of the hoist mechanism, here designated 575b is connected by a line 897 to one input of the spool valve 892, which valve is operable to connect the lines 891 and 897 in series in circumstances to be described to ensure that both ends of the tong bar are brought down together. The lower end of the cylinder 575b is connected by a line 898 to the valve 887.

The ends of an operating cylinder 849 for the scissors-lift table are respectively connected by lines 899 and 900 to a further and similar spool valve 901 having operating solenoids 902 and 903, which valve is also connected to the pressure line 183 and the return line 193.

The hoist motor 616, FIG. 12A, is connected to the pressure line 183 and the return line 193 by a directional spool valve 904 having operating solenoids 905 and 906. One output from the valve 904 on line 907 is pressurised to drive the motor 616 in a direction to lower the tong bar. The other output from the valve 904 is connected by a line 908 to the other side of the motor, and when pressurised drives the hoist motor 616 in a direction to raise the tong bar. The speed of the motor is controlled by a shunt circuit connecting the valve 904 to the return line 193 and including a tappet-operated flow control valve 909 connected in parallel with a by-pass valve 910 which is operable to regulate creep speed of the motor.

Variation of the setting of the valve 909 to control the speed of thee motor 616 is achieved pneumatically as described with reference to FIG. 17.

TILTING BOX PNEUMATIC CIRCUITS

Figure 17:
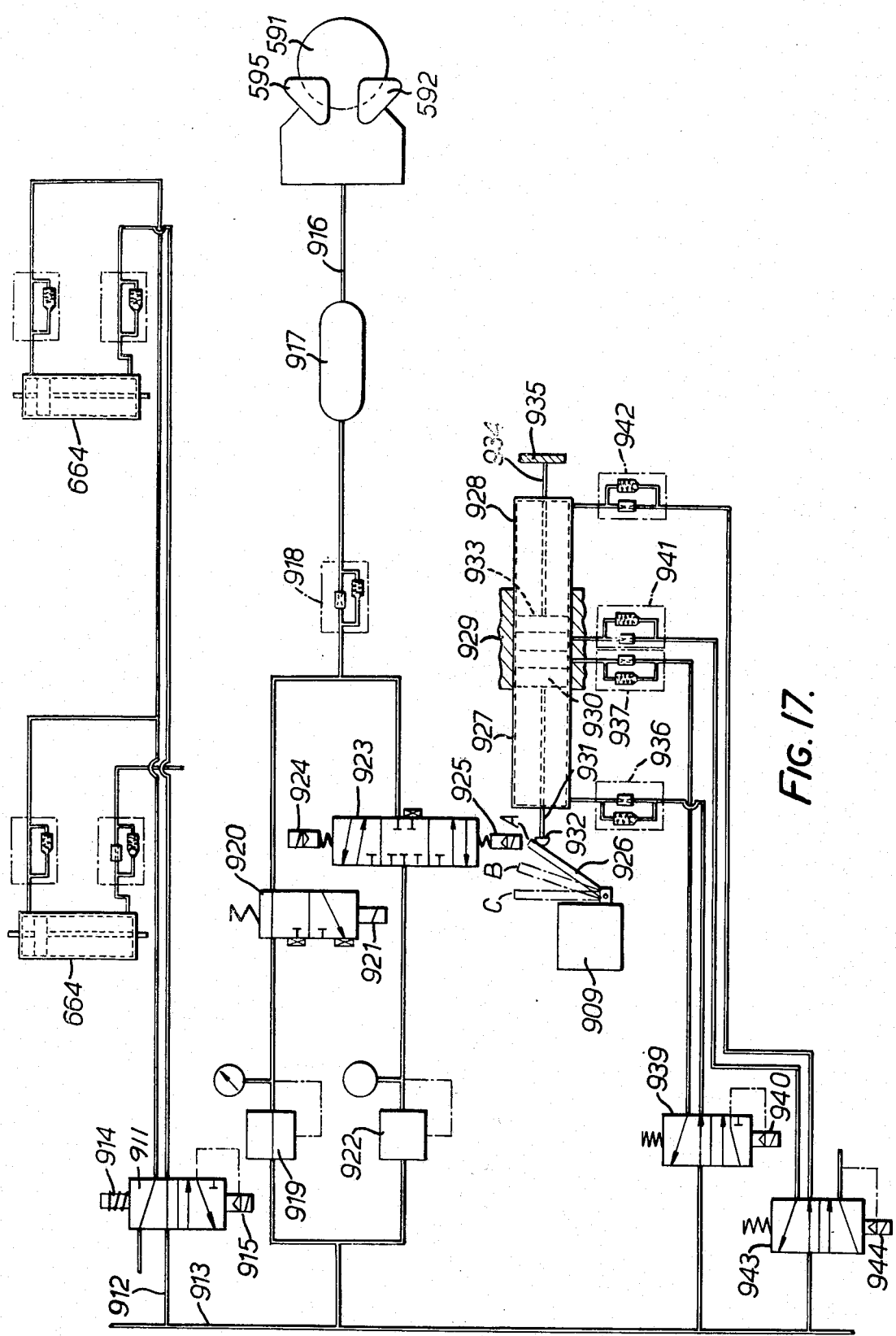
FIG. 17 is a diagrammatic pneumatic circuit for operating the tong opening mechanism, brakes on the hoist mechanism, and speed control of the hoist motor.

Pneumatic control circuits associated with the tilting box are illustrated diagrammatically in FIG. 17.

The upper and lower ends of the two cylinders 664, FIG. 12, which depress the pusher rods 662 to open the tongs, are connected in parallel to a solenoid operated spool valve 911 which has an input connected by a line 912 to an air pressure line 913.

The valve 911 has operating solenoids 914 and 915. When air under pressure is switched the tops of both cylinders 664 the pusher rods 662 are depressed and the tong jaws open, and vice versa when pressure air is switched to the bottoms of the cylinders downward force is removed from the pusher and the tongs open.

FIG. 17 also shows one pneumatic circuit for operating the disc brake 591 associated with the hoist drum 590, FIG. 12. Pneumatically operated caliper arms 592 for engaging the brake disc 591 are connected by a line 916 to an air reservoir 917 which is supplied through a regulator 918 from parallel high pressure and low pressure circuits whose inputs are connected to the pressure line 913.

The high pressure circuit, whose function is to engage the brakes and hold the hoists in wound-up condition until the gripped glass is to be lowered from the bendig dies, comprises a pressure regulator 919 and a spool valve 920 having an operating solenoid 921 energisation of which releases the brake.

The low pressure circuit is similar, having a low pressure regulator 922 and a solenoid-operated spool valve 923 having a solenoid 924 energised for a low pressure condition and a solenoid 925 energised for a zero pressure condition as will be described. The function of the low pressure circuit is to prevent "snatching" of the hoist winding gear when lowering a bent glass sheet.

The speed control hydraulic valve 909 for the hoist motor 616, FIG. 16, is operated by a lever arm 926 which can assume three-positions, marked A, B and C in FIG. 17, each setting a motor speed, under control of a double acting cylinder assembly comprising two cylinders 927 and 928 which are joined end-to-end and slidable as a whole in a fixed housing 929.

The cylinder 927 has a piston 930 mounted on a piston rod 931 whose outer end carries a doomed head 932 which engages the lever arm 926 of the speed control valve 909.

The cylinder 928 has a piston 933 on a piston rod 934 whose outer end is fixed to a fixed bracket 935.

The inner and outer ends of the cylinder 927 are respectively connected through flow control valves 936 and 937 to a solenoid operated spool valve 939 having a single operating solenoid 940 and connected to the pressure air line 913. Energisation of solenoid 940 sets the pneumatic circuit to determine a first motor speed. The inner and outer ends of the cylinder 928 are similarly connected by flow control valves 941 and 942 to a further spool valve 943 having a single operating solenoid 944. The vallve 943 is also connected to the pressure line 913, and energisation of the solenoid 944 sets a second speed of the hoist motor 616 as will be described.

BENDING AND TOUGHENING OPERATION

Figure 20:
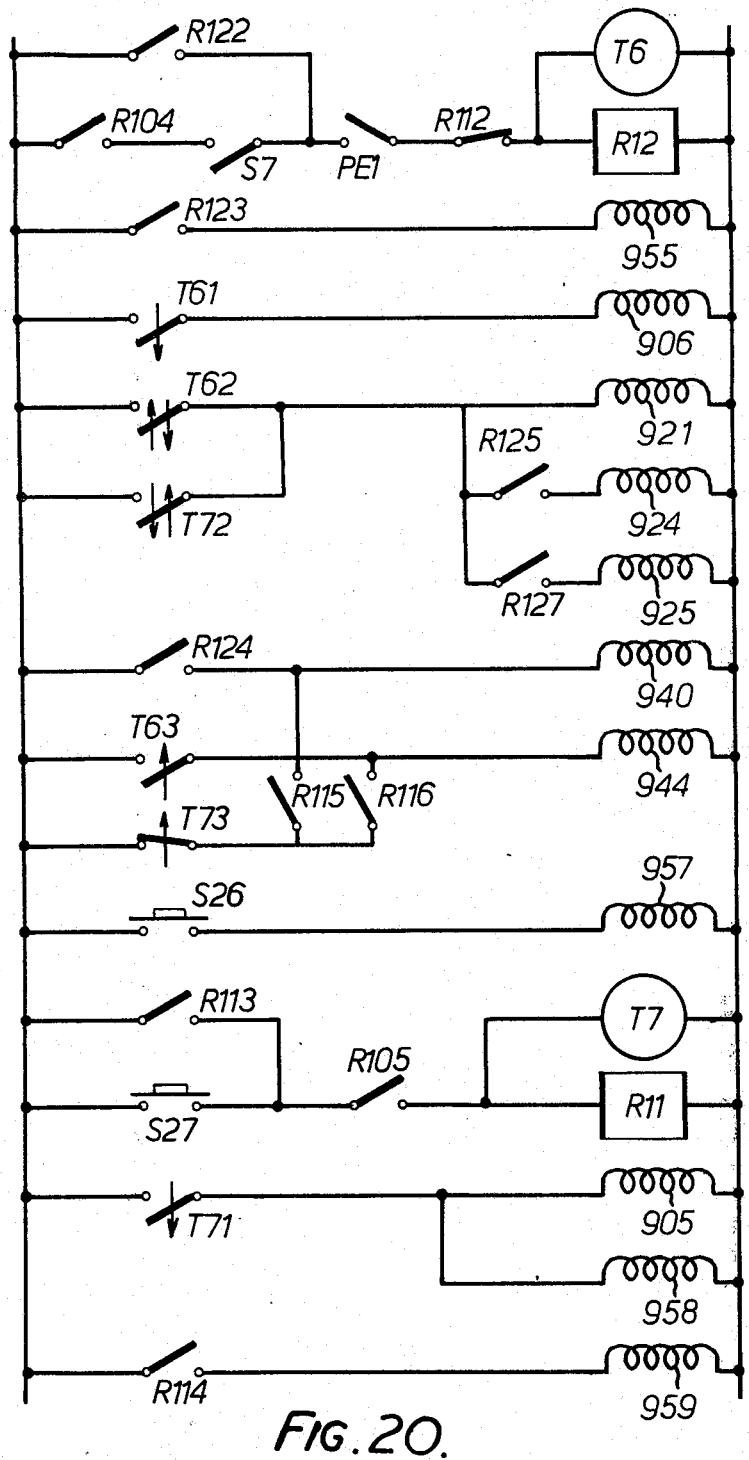

When a previous die bending operation has finished, the dies are fully withdrawn, the tilting box is in its inclined position to receive the next hot glass sheet, lowering of the glass has begun, and contacts R121, R122 and R123 of the hoist lower relay R12, FIG. 20, close. A circuit is operated including a solenoid which removes the carriage stop 242, and the carriage is accelerated out of the tilting box.

Meanwhile all the rollers 8 and 13 in the furnace and in the tilting box are all now being driven at creep speed; and at the same time contacts open to disengage the clutch driving the rollers of the exit conveyor which are then brought to rest so that the carriage is stationary on the exit section of the conveyor and can be removed and taken back to the inlet end for reloading. The reset push button switch is then closed to start up the whole operation for processing of the next sheet.

The initial condition of the apparatus is that both the male die and the female die are withdrawn, the tong bar is raised and the tilting box is inclined, e.g. at a 5° angle.

Figure 18:
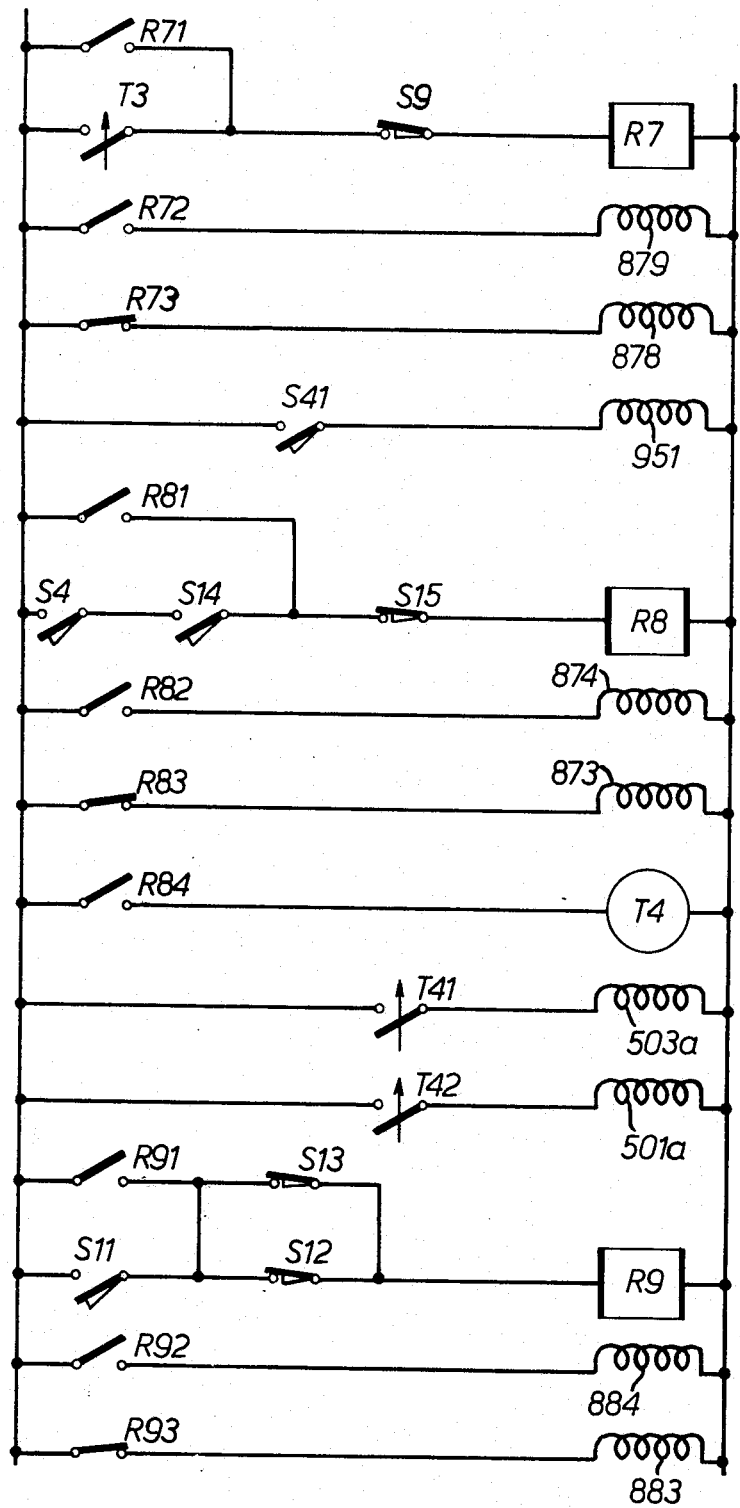
FIGS. 18, 19 and 20 are circuit diagrams of switching circuits for operating the hydraulic and pneumatic circuits of FIGS. 50 and 51.

The male die actuating cylinder 411a, FIG. 16, has been operated to retract the male die by energisation of solenoid 878 of the valve 877, FIGS. 16 and 18, through norally closed contacts R73 of a male die relay R7 which also has holding contacts R71 and normally open contacts R72 in series with solenoid 879 of the valve 877. Energisation of solenoid 878 normally holds the male die out.

Similarly the female die actuating cylinder 411 is operated by female die relay R8 having holding contacts R81 normally open contacts R82 in series with the solenoid 874 of the valve 872, and normally closed contacts R83 in series with the coil 873 of valve 872. Energization of solenoid 873 normally holds the female die out.

The tilting of the tilting die box is controlled by a roller vertical relay R9 having holding contacts R91 normally closed contacts R93 in series with solenoid 883 of the cylinder 301, and normally open contacts R92 in series with solenoid 884 of the valve 882. Normally the solenoid 883 is energized so that the cylinder 301 maintains the frame in its inclined position.

A tong bar relay R10 is in series with the hoist raised switches S16, FIG. 12, and rollers vertical switch S8 and the female die in switch S10. The relay R10 has holding contacts R101, and normally closed contacts R102 in series with solenoid 889 of the valve 887, FIG. 16. In parallel with the solenoid 889 is the solenoid 893 of the compensating valve 892, which solenoid 893 is in series with two parallel hoist raised switches S16 which are respectively on the left-hand and right-hand hoist mechanisms of FIGS. 12A and 12C.

Relay R10 also has normally-open contacts R103 in series with solenoid 888 of the valve 887. In parallel with solenoid 888 is solenoid 894 of the compensating valve 892 which solenoid 894 is connected in series with two parallel hoist lowered switches S17.

With the tong bar rising in a mid-position coil 889 is energised and the hydraulic circuits for the two cylinders 575 are connected in series with pressure fluid fed on line 898 of valve 887 to the bottom of cylinder 575b. Fluid under pressure from the top of cylinder 575b passes on line 897 and through the compensating valve 893 on to line 891 connected to the bottom of cylinder 575a.

The two pistons in the cylinders 575a and 575b rise together but may not reach the top of their stroke together. Whichever hoist raised switch S16 closes first energises solenoid 893 of the compensating valve 892 which changes over to connect pressure fluid directly to the bottom of cylinder 575a thereby ensuring that both hoist frames are in their raised position as nearly as possible at the same time.

When the tong bar is being lowered, the gripper bar relay R10 is energised to open contacts R102 and close contacts R103 which energises coil 888. The compensating valve 892 is in position to connect the two cylinders 575 in series. Pressure fluid is fed on line 890 to the top of cylinder 575a and from the bottom of that cylinder on line 891 through the valve 892 to the top of cylinder 575b. When one of the cylinders reaches the bottom of its stroke one of the hoist lowered switches S17 is closed to energise solenoid 894 to switch over the compensating valve 892 so that pressure fluid is fed from line 895 to line 897 to the top of cylinder 575b and both the cylinders 575 are brought down together to bring the tong bar horizontally into position above the closed bending dies.

The male die timer which was actuated when the sheet was in the furnace now commences the actuation of the male die and after a delay, closes the contacts T31, FIG. 18 which are connected in series with the female die partly out switch S12 and the coil of the male die relay R7 whose holding contacts R71 are in parallel with the switch T31. Actuation of the relay R7 causes contacts R73 to open and contact R72 to close so that solenoid 878 of valve 877, FIG. 16, is de-energised and solenoid 879 is energised, and pressure fluid is fed on line 876 to the cylinder 411a to cause inward movement of the male die.

When the male die is fully in, the male dies in switch S14 closes. While the male die is moving in, a carriage 12 carrying a glass sheet 9 is still moving and operates switch S4 before it comes to rest against the carriage stop 242. Operation of switch S4 initiates the inward movement of the female die, so that the lifting fingers on the bottom of the female die lift the hot glass sheet 9 from the carriage 12 before the carriage is brought to rest against the carriage stop so that the impact of the carriage against carriage stop is not transmitted to the hot glass sheet.

While the male die in and the switch S4 closed as the carriage 12 approaches the carriage stop 242 the female die relay R8 is energised through a closed reset switch S15 on the lifting finger mechanism.

By this time the male die has moved in to bending position and the male die in switch S14 is closed so that when the switch S4 is closed as the carriage is conveyed into the tilting box the female die relay R8 is energised and is latched in by its holding contacts R81. The normally-closed contacts R83 open and normally-open contacts R82 close so that solenoid 874 of the female die actuating valve 872, FIG. 16 is energised and solenoid 873 is deenergised and inward movement of the female die begins. Contacts R84 on the female die relay R8 also close and start operation of the timer T4 which after a time delay closes contacts T41 which actuate the solenoid 503a of the valve 503, FIG. 11, to apply vacuum to the male die in order to assist bending by drawing the hot glass sheet against the male die surface 480.

The contacts T41 close to apply the vacuum at a time when the bending operation is almost complete and the female die is just reaching the end of its inward movement. At a later time after bending and when the female die is being retracted and the upper edge of the sheet has already been gripped by the tongs, contacts T41 open and contacts T42 of timer T4 close to energise operating solenoid 501a of the pressure valve 501 to supply air under pressure to the male die to assist in releasing the bent glass sheet from the male die surface.

As the female die moves in the lifting fingers pick up the hot glass sheet from the carriage and the sheet is engaged by the female die sections as they move through the rollers 8 in the tilting box. The hot sheet is then carried forwardly from the rollers 8 towards the male die. The female dies partly in switch S11 closes which switch is in series with the normally closed female die out switch S12 and with the coil of the rollers vertical relay R9 which is energised and closes holding contacts R91 to latch the relay through normally-closed male die part out switch S13. The normally closed contacts R93 open and the normally-open contacts R92 close so that solenoid 883 of valve 882, FIG. 16, is de-energised and solenoid 884 is energised and the cylinder 301 is operated to tilt the frame to its horizontal position which brings the rollers 8 in the tilting box vertical. It is during this tilting movement of the tilting box that the inward movement of the female die is completed to complete the bending of the glass between the dies, the bent glass is then being held on the lifting fingers between the closed dies.

Figure 19:
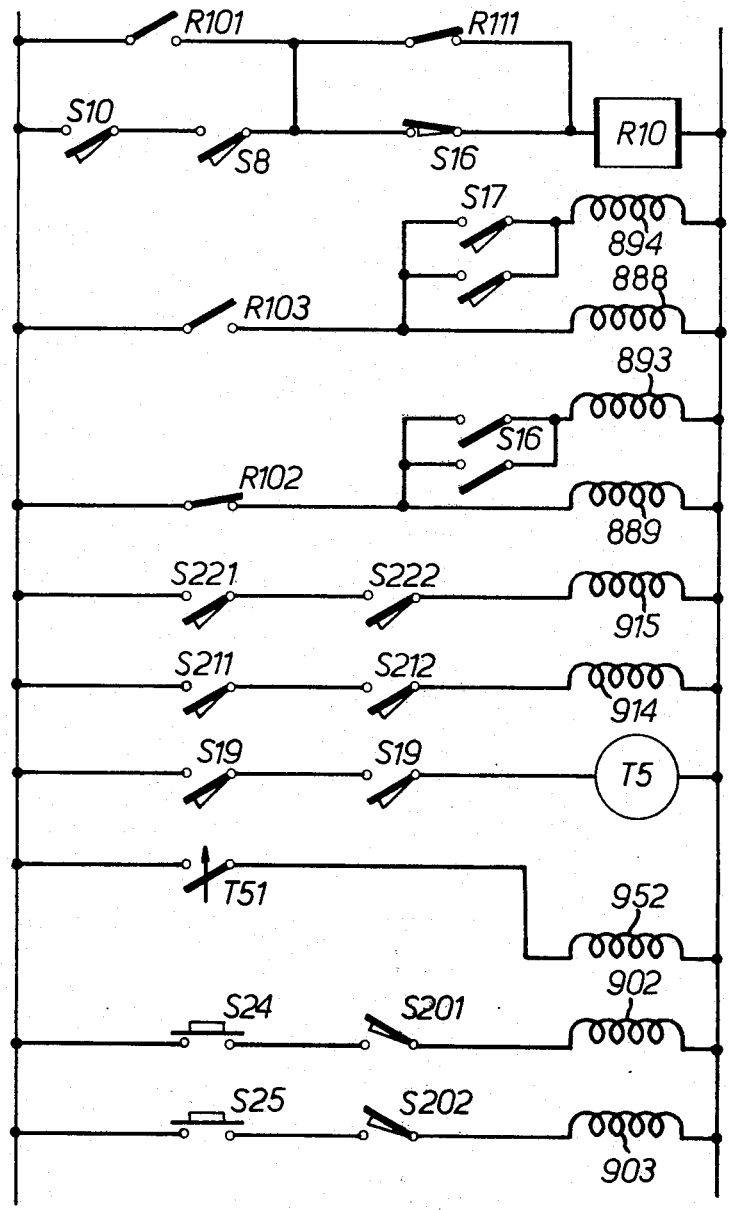

When the female die is fully in, the female die in switch S10 closes, FIG. 19. This swich S10 is in series with the rollers vertical switch S8, the hoist raised switches S16, which are closed in the condition in which the hoist frames 581 are raised, and with the coil of the tong bar relay R10. In parallel with the female die in switch S10 and the rollers vertical switch S8 is holding contact R101 of the relay R10, and a normally closed contact R111 of a hoist raised relay R11, FIG. 20 is in parallel with the hoist raised switches S16. When the female die in switch S10 closes the relay R10 is actuated, contacts R102 open and contacts R103 close, the valves 887 and 892, FIG. 16, supply pressure fluid to the cylinder 575a and 575b and lowering of the hoist frames 581 begins, FIG. 12, to begin the lowering of the tong bar 23 towards the upper edge of the bent glass sheet held between the dies.

While the tong bar 23 is raised contacts S211 and S212 on tong bar raised switch 21 are closed and solenoid 914 of the pneumatic spool valve 911, FIG. 17, is energised to supply pressure air to the tops of the cylinders 664, FIG. 12, to be depressed so that the tong jaws open. As the tong bar is lowered the open tong jaws become positioned exactly above the upper edge of the glass sheet which is held between the bending dies the tong jaws having moved downwardly into the recesses formed in the upper edge of the male die and between the sections of the female die.

When the tong bar is lowered switch contacts S221 and S222 on a switch S22 close and the solenoid 915 of valve 911 is energised to cause the valve to change over so that the pusher rods 662 are retracted and the tong jaws close under the weight of their sliders, onto the upper edge of the glass sheet.

When the pusher rods 662 are retracted the two switches S19 close to actuate a timer T5 which is set to the shortest possible time delay, up to 5 seconds, to allow the tong points to grip into the upper edge of the glass sheet so that the sheet is securely suspended from the tongs when the dies open. Contacts T51 of the timer T5 then close to energise solenoid 952 of a pneumatic valve 950, which is operable to drop the lifting fingers. The striker plate 556 engages the switch S15 to open its normally-closed contacts and the female die relay R8 is de-energised. The contacts R82 open and the contacts R83 close, solenoid 874 of valve 872 is de-energised and solenoid 873 is energised and the retraction of the female die begins. The time of closure of the dies to bend the glass sheet may be for example 8 seconds.

When the female die is partly out the female dies partly out switch S9 opens to de-energise the male die relay R7 so that contacts R73 open and contacts R72 close, solenoid 879 of valve 877 is energised and solenoid 878 is de-energised and retraction of the male die begins.

When the female die is fully out the female die out switch S12 opens, and at this time the male die is partly out and the male die partly out switch S13 opens and when both switches have been opened the rollers vertical relay R9 is de-energised, contacts R92 open and contacts R93 close, and the solenoid 884 of valve 882 is de-energised and the solenoid 883 is energised so that pressure fluid is supplied to the bottom of the cylinder 301 to tilt the rocking frame back to its inclined position with the upright rollers 8 in the tilting box and their present angle, e.g. 5°, to the vertical, ready for receiving the next glass sheet from the furnace. The retraction of the male die continues until it is fully out. The bent glass sheet is left freely suspended in the tongs between the open bending dies ready for lowering through the boost heat section and the pre-cooling section into the chilling liquid.

When the rocking frame is tilted to its inclined position the rollers tilted switch S7, FIG. 20, closes. This switch S7 is in series with closed contacts R104 of the tong bar relay R10, normally closed contacts PE1 of a photo electrically operated switch which is operated by the plates 668 on the hoist as will be described, normally closed contacts R112 of the hoist raise relay R11, and with the coil of a hoist lower relay R12 and with a hoist lower time T6. The relay coil R12 and the time T6 are connected in parallel.

Holding contacts R122 of the hoist lower relay R12 close to latch the relay. Contacts R123 close to energize a solenoid 955 which lowers the exit stop 242 to permit the carriage 12 to be conveyed out of the tilting box.

The hoist lower timer T6 immediately closes contacts T61 to energise the solenoid 906 of the valve 904 controlling supply of pressure fluid to the hoist motor 616. At the same time contacts R124 of the hoist lower relay R12 are closed to energise the solenoid 940 of valve 939, FIG. 17, to supply pressure air through the valve 937 to the cylinder 927 so that the piston 930 is extended and the lever arm 926 of valve 909 moves from position A corresponding to zero speed of the motor 616 to position B which determines a first speed of the hoist motor 616. At this time the drums of the hoists are held stationary by engagement of the disc brake, the slipping clutch of each drum permitting thsi although the motor is being driven.

After a set time delay, for example 2 seconds, the contacts T62 of the hoist lower timer T6 close to energise the brake release solenoid 921 of the valve 920 in the brake operating circuit, to take high pressure off the brake caliper arms and at the same time energises the lower pressure solenoid 924 of the valve 923 through contacts R125 of the hoist lower relay R12. After a further time relay, up to 20 seconds, the contacts T63 of the timer T6 close to energise the solenoid 944 of the pneumatic valve 943 which switches pressure air through the flow control valve 941 to the inner end of the cylinder 928 causing that cylinder to move in the housing 929, towards the right as shown in FIG. 17, and cause movement of the lever arm to position C to determine a second faster speed of the hoist motor 616.

This acceleration of the hoists motor 616 to a second speed takes place at the appropriate time when it is required to accelerate part of the glass sheet through the boost heat section to achieve a temperature gradient in the glass as described with reference to FIG. 14. The acceleration takes place for example when the lower edge of the glass sheet has just passed through the boost heater panels.

The plates 668 on the tong bar 23 not cut off light beams to photoelectric cells not shown, which are connected to switching circuits which open the contacts PE1 to deenergise the hoist lower relay R12 and the hoist lower time T6 which instantaneously releases switches R124 and T63 to de-energise the solenoids 940 and 944, thereby retracting the double cylinder system 927, 928 and causing the lever arm 926 of valve 909 to return to position A so that the speed of the hoist motor returns to zero.

After a delay to permit deceleration of the hoist system the switch T62 opens and the brake release solenoid 921 is de-energised, this operates in the brake circuit to put the high pressure back on to the brake caliper arms to brake the hoist motor when the lower edge of the glass sheet is just reaching the shoes 807, FIG. 15, in which the glass rests. The contacts T61 open after a delay to de-energise the hoist lower solenoid 906, the motor 616 then being stationary.

When the glass is being heat in the furnace prior to entry into the tilting box for bending, a push button switch S24 is closed, and operates solenoid 902, FIG. 16, of the valve 901 operating the scissors lift table, through normally-closed contacts S201 to supply pressure to the bottom of cylinder 849 to raise the table 30 carrying the quench tank 26 to the raised position ready to receive the hot bent glasss. When the tank 26 reaches its raised position the contacts S201 open and the valve 901 maintains pressure on the cylinder to maintain the tank 26 in its raised position.

A few seconds after the hoist motor 616 has stopped and the glass is quenched in the tank, a push button switch S25 is operated to energise solenoid 903 of valve 901 through closed contacts S202, which switches pressure fluid to the top of cylinder 849 to lower the scissors lift table which leaves the quenched glass 856 in the rack 807, 808 as the quench tank 26 moves downwardly. The contacts 202 open when the tank reaches its lowermost position and de-energises the solenoid 903.

The glass is now supported in the rack 807, 808 and is still gripped by the tongs. To open the tongs a tong release switch S26 is operated to energise a solenoid 957 which causes pusher members, not shown, in the pit, to engage the striker plates 655 on the arms 654 to tension the cables 661 and open all the tongs. The glass sheet then settles on to the rack, the tong points then being just clear of the upper edge of the sheet and the tongs can close again prior to being lifted by the hoist.

A further push button switch S27 is then pressed and energises through closed contacts R105 of the tong bar relay R10 the hoist raise relay R11 and the hoist raise timer T7.

The relay R11 is latched by its holding contacts R113 and instantaneously the timer T7 closes contacts T71 to energise the solenoid 905 of valve 904, and solenoid 958 of the by pass valve 910 in the hoist motor supply circuit.

At the same time contacts R114 of the hoist raise relay R11 close to energise a solenoid 959 which raises the carriage stop 242. The contacts R115 and R116 close to energise, through normally-closed contacts T73 of timer T7, the speed control solenoids 940 and 944 so that the lever arm 932 is moved to position C and the hoist motor 616 is accelerated up to top speed determined by fluid flow through the fully open valve 909 and the open bypass valve 910 in parallel.

The tong bar is thus returned quickly before the next glass sheet moves between the dies and when near the top of its upward travel the contacts T73 of the hoist raise timer T7 open to de-energise the speed control solenoids 940 and 944. The motor 616 decelerates to a creep speed determined by the by-pass valve 910 and continues to raise the tong bar at creep speed.

The hoist raise timer T7 has further contacts T72 which close after a delay to energise the brake release solenoid 921 which causes the valve 920 to remove the high pressure from the brake calipers and at the same time through closed contacts R127 energises the zero pressure solenoid 925 of the brake circuit. The brake is right off the hoist motor 616 at this stage.

The normally closed contacts R111 of the hoist raise relay R11 open when that relay is energised and when the hoist raised switches S16 are all open the tong bar relay R10 is de-energised, switch R102 closes and switch R103 opens to raise the hoist frames 581 by actuation of the valves 887 and 892 to raise the pistons in the cylinders 575. Contacts R105 also open to de-energise the hoist raise relay R11 and the hoist raise timer T7. After a time delay to permit the motor 616 to wind up any slack and to ensure that the wires have all been raised together and to make sure that there is just enough tension on the slipping clutch on each drum to make sure that the wires are up together, the switch T71 opens to de-energise the solenoids 905 and 958 of the valves in the motor circuit, so that the hoist motor 616 is brought to rest. At the same time the contacts T72 open to put full pressure back onto the brake caliper arms.

When the tong bar is fully raised the switches S211 and S212 close to energise solenoid 914 and open the tongs.

The processing sequence then restarts for the next sheet to be bent and toughened.

We claim:

1. In a method of toughening a glass sheet wherein the glass sheet is heated to a predetermined temperature condition in which condition it can be bent, glass-bending dies are closed on to the sheet, those bending dies are retracted from the sheet, and the sheet is toughened by contacting its surfaces with a chilling medium, the improvement comprising:

after bending and prior to toughening of the bent sheet, controllably passing the bent glass sheet through a heating zone to establish sufficient residence of said sheet in the heating zone so as to heat the sheet substantially uniformly throughout its thickness to a pre-quenching temperature condition above the temperature at which it leaves the glass bending dies but at which the sheet remains bent for quenching the bent sheet.

2. A method according to claim 1, wherein the step of contacting the surfaces of the bent sheet with a chilling medium includes the preliminary step of subjecting the glass sheet to cooling gas streams to induce surface-to-centre temperature gradients through the thickness of the glass sheet.

3. A method according to claim 1 wherein the glass is heated to a predetermined bending temperature, and the bending dies are maintained at the same temperature as said bending temperature.

4. A method according to claim 3, wherein the glass is a sheet of soda-lime-silica glass, said bending temperature is in the range 570° to 650°C and said pre-quenching temperature is in the range 620° to 720°C.

5. A method according to claim 1, wherein the bent glass sheet is heated to said pre-quenching temperature condition to increase the temperature substantially uniformly throughout the thickness of the sheet and to induce a substantially linear temperature gradient in the glass sheet from a higher temperature in the region of the leading edge of the sheet which contacts the chilling medium first to a lower temperature in the region of the trailing edge of the sheet.

6. A method according to claim 5, wherein the heating of the bent glass sheet comprises lowering the bent glass sheet at a first speed through said heating zone which is of greater depth than the height of the sheet into a zone where it contacts the chilling medium, and at a predetermined time after entry of the lower edge of the sheet into the heating zone while the upper edge of the sheet is still within the heating zone, accelerating the sheet to a second higher speed for entry into the chilling medium, thereby heating the lower edge of the sheet to a higher temperature than the upper edge.

7. A method according to claim 6, wherein the sheet is accelerated to said second higher speed when the lower edge of the sheet reaches the bottom of the heating zone.

8. A method according to claim 5, wherein the glass sheet is a sheet of soda-lime-silica glass which prior to bending is within the temperature range 570° to 650°C. and which when heated to said pre-quenching temperature condition is within the temperature range 620° to 720°C.

9. A method according to claim 8, wherein the leading edge of the glass sheet is from 5° to 30°C hotter than the trailing edge of the sheet.

10. A method according to claim 9, wherein the leading edge of the sheet is 20°C hotter than the trailing edge of the sheet.

11. A method according to claim 10, wherein said substantially linear temperature gradient is induced in the glass sheet from 700°C. at the leading edge of the sheet to 680°C. at the trailing edge of the sheet.

12. In a method of toughening a glass sheet wherein the glass sheet is heated to a predetermined temperature condition in which condition it can be shaped, glass-shaping surfaces are closed on to the sheet, those surfaces are retracted from the sheet, and the shaped sheet is toughened by contacting its surfaces with a chilling medium, the improvement comprising:

after shaping and prior to toughening of the shaped sheet, controllably passing the shaped glass sheet through a heating zone to establish sufficient residence of said sheet in the heating zone so as to heat the sheet substantially uniformly throughout its thickness to a pre-quenching temperature condition above the temperature at which it leaves the glass shaping surfaces but at which the sheet remains shaped for quenching of the shaped sheet.

13. A method according to claim 12 wherein the step of contacting the surfaces of the shaped sheet with a chilling medium includes the preliminary step of subjecting the glass sheet to cooling gas streams to induce surface-to-centre temperature gradients through the thickness of the glass sheet.

14. A method according to claim 12 wherein the glass sheet is heated to a predetermined shaping temperature, and the glass shaping surfaces are maintained at the same temperature as said shaping temperature.

15. A method according to claim 14 wherein the glass is a sheet of soda-lime-silica-glass, said shaping temperature is in the range 570° to 650°C. and said pre-quenching temperature is in the range 620° to 720°C.

16. A method according to claim 12 wherein the shaped glass sheet is heated to said pre-quenching temperature condition to increase the temperature substantially uniformly throughout the thickness of the sheet and to induce a substantially linear temperature gradient in the glass sheet from a higher temperature in the region of the leading edge of the sheet which contacts the chilling medium first to a lower temperature in the region of the trailing edge of the sheet.

17. A method according to claim 16 wherein the heating of the shaped glass sheet comprises lowering the shaped glass sheet at a first speed through said heating zone which is greater depth than the height of the sheet into a zone where it contacts the chilling medium, and at a predetermined time after entry of the lower edge of the sheet into the heating zone while the upper edge of the sheet is still within the heating zone, accelerating the sheet to a second higher speed for entry into the chilling medium, thereby heating the lower edge of the sheet to a higher temperature than the upper edge.

18. A method according to claim 17 wherein the sheet is accelerated to said second higher speed when the lower edge of the sheet reaches the bottom of the heating zone.

19. A method according to claim 16 wherein the glass sheet is a sheet of soda-lime-silica glass which prior to shaping is within the temperature range 570° to 650°C. and which when heated to said pre-quenching temperature condition is within the temperature range 620° to 720°C.

20. A method according to claim 19 wherein the leading edge of the sheet is 20°C. hotter than the trailing edge of the sheet.

21. A method according to claim 20 wherein said substantially linear temperature gradient is induced in the glass sheet from 700°C. at the leading edge of the sheet to 680°C. at the trailing edge of the sheet.

22. In a method of toughening a glass sheet wherein the glass sheet is heated to a predetermined temperature condition in which condition it can be shaped, glass-shaping surfaces are closed on to the sheet, those surfaces are retracted from the sheet, and the shaped sheet is toughened by contacting its surfaces with a chilling medium, the improvement comprising:

after shaping and prior to toughening of the shaped sheet, passing the shaped glass sheet between heaters which are at a temperature in the range 750° to 1600°C., in a transit time of between 1.3 and 45 seconds, which transit time is sufficient to heat the sheet substantially uniformly throughout its thickness to a pre-quenching temperature condition at least 10°C. above the temperature at which it leaves the glass shaping surfaces but at which the sheet remains shaped for quenching of the shaped sheet.

23. The method of claim 13 wherein the sheet is heated to said pre-quenching temperature condition at least 60°C. above the temperature at which it leaves the glass shaping surfaces.

24. In a method of toughening a glass sheet wherein the glass sheet is heated to a predetermined temperature condition in which condition it can be shaped, glass-shaping surfaces are closed on to the sheet, those surfaces are retracted from the sheet, and the shaped sheet is toughened by contacting its surfaces with a chilling medium, the improvement comprising:

after shaping and prior to toughening of the shaped sheet, passing the shaped glass sheet between heaters which are at a temperature in the range 750° to 1600°C, in a transit time of between 1.3 and 45 seconds, which transit time is sufficient to heat the sheet substantially uniformly throughout its thickness to a pre-quenching temperature from 10° to 140°C. above the temperature at which it leaves the glass shaping surfaces but at which the sheet remains shaped for quenching of the shaped sheet.

25. In a method of toughening a glass sheet wherein the glass sheet is heated to a predetermined temperature condition in which condition it can be bent, glass-bending dies are closed on to the sheet, those bending dies are retracted from the sheet, and the sheet is toughened by contacting its surfaces with a chilling medium, the improvement comprising:

after bending and prior to toughening of the bent sheet, passing the bent glass sheet between heaters which are at a temperature in the range 750° to 1600°C., in a transit time of between 1.3 and 45 seconds, which transit time is sufficient to heat the sheet substantially uniformly throughout its thickness to a pre-quenching temperature from 10° to 140°C. above the temperature at which it leaves the glass bending dies but at which the sheet remains bent for quenching the bent sheet.

* * * * *